(12) United States Patent
Hiramatsu

(10) Patent No.: US 7,424,927 B2
(45) Date of Patent: Sep. 16, 2008

(54) VEHICLE, VEHICLE CONTROL DEVICE AND VEHICLE CONTROL METHOD

(75) Inventor: Yuji Hiramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 370 days.

(21) Appl. No.: 11/112,472

(22) Filed: Apr. 22, 2005

(65) Prior Publication Data

US 2005/0242538 A1 Nov. 3, 2005

(30) Foreign Application Priority Data

Apr. 28, 2004 (JP) ............... 2004-134902

(51) Int. Cl.
*B60K 28/14* (2006.01)
(52) U.S. Cl. .................... 180/282; 180/21
(58) Field of Classification Search ......... 180/282, 180/271, 21, 41, 218; 280/79.11, 6.151, 280/6.153, 6.154, 6.16, 205
See application file for complete search history.

(56) References Cited

U.S. PATENT DOCUMENTS 6,302,230 B1 * 10/2001 Kamen et al. ............ 180/171
6,651,766 B2 * 11/2003 Kamen et al. ............ 180/218
6,868,931 B2 * 3/2005 Morrell et al. ............ 180/170
7,023,330 B2 * 4/2006 Kamen et al. ............ 340/427

FOREIGN PATENT DOCUMENTS

| JP | 04-201793 | 7/1992 |
| JP | 09-175462 A | 7/1997 |
| JP | 3070015 B | 5/2000 |
| WO | WO 00/75001 A1 | 12/2000 |

OTHER PUBLICATIONS

Yuji Hiramatsu; "Vehicle, Vehicle Control Device and Vehicle Control Method"; U.S. Appl. No. 11/112,496, filed on Apr. 22, 2005.

\* cited by examiner

*Primary Examiner*—Christopher Ellis
*Assistant Examiner*—Robert A. Coker
(74) *Attorney, Agent, or Firm*—Keating & Bennett, LLP

(57) ABSTRACT

A motorized balance board includes a gyrosensor. An arithmetic operation unit calculates a tilt angle change value based on a signal output from the gyrosensor. When the control mode is a standby mode, a control mode switch element switches the control mode to a riding mode when the absolute value of the tilt angle change value exceeds a riding angular velocity threshold. When the control mode is the riding mode, the control mode switch element switches the control mode to the standby mode when the absolute value of the tilt angle change value exceeds a descending angular velocity threshold.

20 Claims, 20 Drawing Sheets

F I G. 1 4
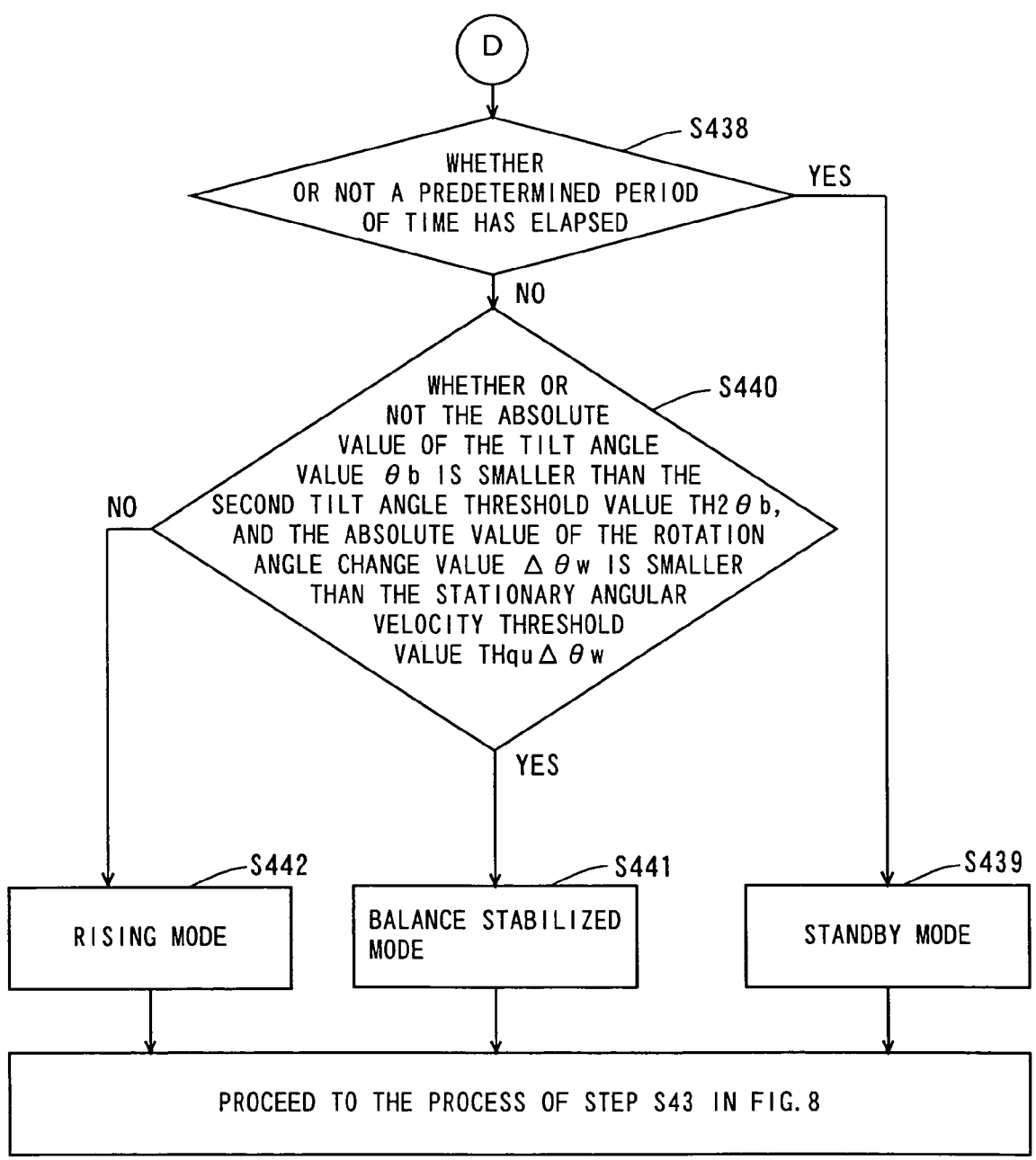

F I G. 1 9
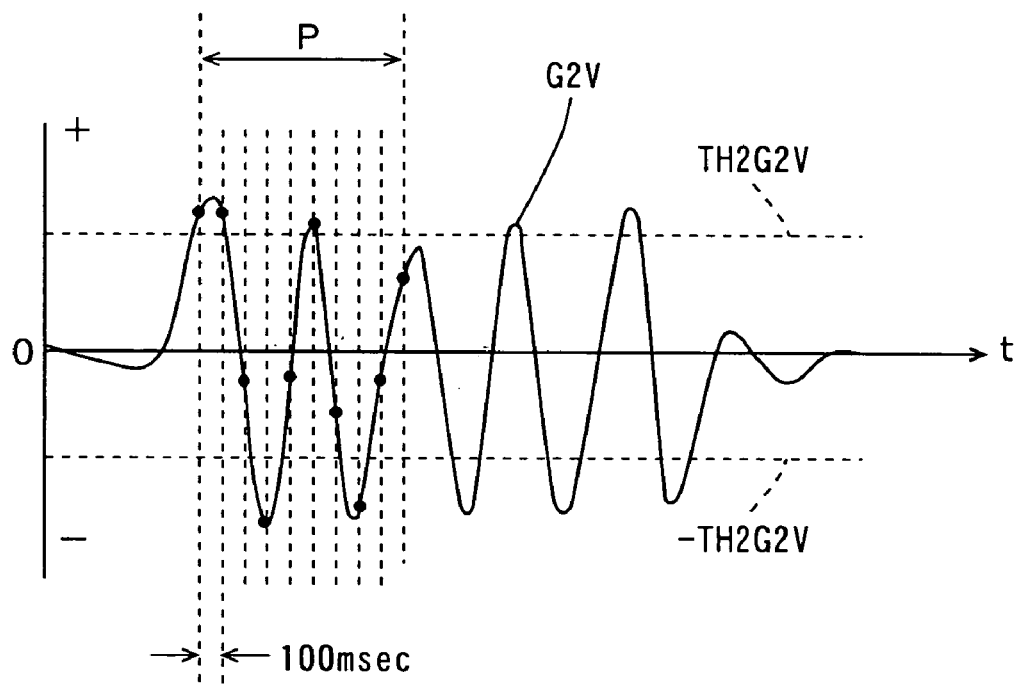

VEHICLE, VEHICLE CONTROL DEVICE AND VEHICLE CONTROL METHOD

BACKGROUND OF THE INVENTION

1. Field of the Invention

The present invention relates to vehicles such as a unicycle and coaxial two-wheeled vehicle, a control device for such vehicles, and a control method for such vehicles.

2. Description of the Background Art

Conventionally, unstable vehicles such as unicycles, coaxial two-wheeled vehicles and the like which are capable of automatically keeping their balance are known (refer to JP 9-175462 A, JP 3070015 B or WO 00/75001, for example.) Such an unstable vehicle is configured so as to freely swing with the wheel as a supporting point.

JP 9-175462 A discloses a unicycle that provides reduced swinging while being capable of adjusting the self-stabilizing force. This unicycle uses a control moment gyro (CMG) swinging reducing device to reduce the angular velocity of the axle about which the unicycle swings. This improves stability in the front or rearward direction and in the rightward or leftward direction during travel.

JP 3070015 B discloses a control device for controlling running of an unstable vehicle such as a unicycle. The aforementioned control device provides travel of an unstable vehicle by driving a rotor based on the direction, angle, and velocity of inclining of the frame.

WO 00/75001 discloses a personal transporting vehicle that includes a coaxial two-wheeled vehicle. With the aforementioned personal transporting vehicle, the moving direction and velocity of the vehicle is decided based on inclining of the vehicle in the front or rearward direction.

The unicycle according to the aforementioned JP 9-175462 A and the control device according to the JP 3070015 B are not capable of determining whether a user is present or absent on a vehicle. The position of the vehicle body is thus controlled, even when the user ascends or descends onto or from the vehicle, by the swinging reducing device or the control device. For this reason, a self-propelled vehicle such as the vehicle described in JP 3070015 B, in particular, may operate against the user's will when he or she is dismounting the vehicle. This makes dismounting the vehicle difficult.

The personal transporting vehicle disclosed in the aforementioned WO 00/75001 determines the presence or absence of a user on the vehicle via a proximity sensor. Providing the proximity sensor, however, results in increased manufacturing cost.

SUMMARY OF THE INVENTION

In order to overcome the problems described above, preferred embodiments of the present invention provide a vehicle in which operations that are unforeseen and unexpected by a user can be prevented, and switching among operating modes can be done according to the user's will, while providing reduced cost and safety as well as a control device for the vehicle and a control method for the vehicle.

According to a preferred embodiment of the present invention, a vehicle includes a body on which a user rides, a wheel that is rotatably supported on the body, a driver that drives the wheel, a tilt detector that detects data concerning a tilt angle of the body, and a controller that controls the driver according to a plurality of operating modes, wherein the controller selects an operating mode based on the data concerning the tilt angle of the body that is detected by the tilt detector.

In the vehicle according to a preferred embodiment of the present invention, the controller controls the driver according to the plurality of operating modes. The tilt detector detects the data concerning the tilt angle of the body, based on which the controller controls the driver to select an operating mode.

In this case, the user can switch one operating mode to another operating mode by intentionally moving the body to adjust the data concerning the tilt angle of the body. This prevents the vehicle from operating in a manner that is unforeseen and unexpected by the user to improve safety. In addition, there is no need to provide separate devices such as sensors and switches for switching among operating modes, resulting in reduced cost of manufacturing the vehicle.

The data concerning the tilt angle may include a rate of change of the tilt angle of the body. In this case, the user can easily switch one operating mode to another operating mode by changing the tilt angle of the body at a predetermined rate of change.

The rate of change of the tilt angle of the body may be an amount of change in the tilt angle of the body per a predetermined period. In this case, the user can easily switch one operating mode to another operating mode by changing the tilt angle of the body at a predetermined angular velocity.

The controller may switch one operating mode to another operating mode when the rate of change of the tilt angle is not less than a predetermined threshold value. In this case, the user can easily switch one operating mode to another operating mode by changing the tilt angle of the body at a rate of change not less than the predetermined threshold value.

The plurality of operating modes may include a moving mode in which the body moves and a stop mode in which the body is stopped.

In this case, the user can move and stop the body by intentionally moving the body to adjust the data concerning the tilt angle of the body. This prevents the body from starting to move against the user's will before he or she gets fully aboard the body, and allows the user to start moving the body at his or her own will after having mounted the body safely. This further prevents the body from starting to move against the user's will when he or she is dismounting from the body, allowing the user to dismount from the body safely.

The vehicle may further include a rotation detector that detects data concerning a rotation angle of the wheel, wherein the controller may control, in the moving mode, the movement caused by the driver based on the data concerning the tilt angle and the data concerning the rotation angle.

In this case, the moving direction and velocity can be adjusted during the travel by the user intentionally adjusting the data concerning the tilt angle. In addition, the actual condition of rotation of the wheel can be fed back to the movement of the vehicle. This provides for smooth adjustment of velocity.

The data concerning the tilt angle may include the rate of change of the tilt angle of the body and the tilt angle of the body, and the data concerning the rotation angle may include a rate of change of the rotation angle of the wheel.

In this case, the moving direction and velocity can be adjusted during the travel by the user intentionally adjusting the rate of change of the tilt angle of the body and the tilt angle of the body. In addition, the rate of change of an actual rotation angle of the wheel can be fed back to the movement of the vehicle. This provides for smooth adjustment of velocity.

The vehicle may further include a rotation detector that detects data concerning a rotation angle of the wheel, wherein the controller may control, in the stop mode, the driver to stop the wheel based on the data concerning the rotation angle.

In this case, the wheel is stopped based on the data concerning the rotation angle of the wheel, which prevents the body from continuing to move, after the moving mode has been switched to the stop mode, because of inertia during the movement. This prevents running of the vehicle against the user's will.

The data concerning the rotation angle of the wheel may include a rate of change of the rotation angle of the wheel. In this case, the wheel is stopped based on the rate of change of the rotation angle of the wheel, allowing the body to reliably stop the movement according to the velocity of the body.

The rate of change of the rotation angle may be an amount of change in the rotation angle of the wheel per a predetermined period. In this case, the wheel is stopped based on the amount of the change in the rotation angle of the wheel per the predetermined period, allowing the body to reliably stop the movement according to the velocity of the body.

The wheel may be arranged on a bottom surface of a central portion of the body so as to rotate about an axis in a direction that intersects with a moving direction of the body. This allows the user to easily adjust the data concerning the tilt angle while easily keeping balance on the body.

The body may be arranged so as to vertically incline with the wheel as a supporting point. This allows the user to adjust the data concerning the tilt angle more easily. The user can thus easily switch one operating mode to another operating mode.

According to another preferred embodiment of the present invention, a vehicle control device for controlling a vehicle that includes a body on which a user rides, a wheel that is rotatably supported on the body, and a driver that drives the wheel, includes a tilt detector that detects data concerning a tilt angle of the body, and a controller that controls the driver according to a plurality of operating modes, wherein the controller selects an operating mode based on the data concerning the tilt angle of the body that is detected by the tilt detector.

In the vehicle control device according to a preferred embodiment of the present invention, the controller controls the driver according to the plurality of operating modes. The tilt detector detects the data concerning the tilt angle of the body, based on which the controller controls the driver to select an operating mode.

In this case, the user can switch one operating mode to another operating mode by intentionally moving the body to adjust the data concerning the tilt angle of the body. This prevents the vehicle from operating in a manner that is unforeseen and unexpected by the user to improve safety. In addition, there is no need to provide separate devices such as sensors and switches for switching among operating modes, resulting in reduced cost of manufacturing the vehicle.

The data concerning the tilt angle may include a rate of change of the tilt angle of the body. In this case, the user can easily switch one operating mode to another operating mode by changing the tilt angle of the body at a predetermined rate of change.

The rate of change of the tilt angle of the body may be an amount of change in the tilt angle of the body per a predetermined period. In this case, the user can easily switch one operating mode to another operating mode by changing the tilt angle of the body at a predetermined angular velocity.

The controller may switch one operating mode to another operating mode when the rate of change of the tilt angle is not less than a predetermined threshold value. In this case, the user can easily switch one operating mode to another operating mode by changing the tilt angle of the body at a rate of change not less than the predetermined threshold value.

According to still another preferred embodiment of the present invention, a vehicle control method for controlling a vehicle that includes a body on which a user rides, a wheel that is rotatably supported on the body, and a driver that drives the wheel, including the steps of detecting data concerning a tilt angle of the body, and controlling the driver to select an operating mode based on the data concerning the tilt angle of the body.

In the vehicle control method according to a preferred embodiment of the present invention, switching of one operating mode to another operating mode is done based on the data concerning the tilt angle of the body.

In this case, the user can switch one operating mode to another operating mode by intentionally moving the body to adjust the data concerning the tilt angle of the body. This prevents the vehicle from operating in a manner that is unforeseen and unexpected by the user to improve safety. In addition, there is no need to provide separate devices such as sensors and switches for switching among operating modes, resulting in reduced cost of manufacturing the vehicle.

The data concerning the tilt angle may include a rate of change of the tilt angle of the body. In this case, the user can easily switch one operating mode to another operating mode by changing the tilt angle of the body at a predetermined rate of change.

The rate of change of the tilt angle of the body may be an amount of change in the tilt angle of the body per a predetermined period. In this case, the user can easily switch one operating mode to another operating mode by changing the tilt angle of the body at a predetermined angular velocity.

The step of controlling the driver may include the step of controlling the driver to switch one operating mode to another operating mode when the rate of change of the tilt angle is not less than a predetermined threshold value. In this case, the user can easily switch one operating mode to another operating mode by changing the tilt angle of the body at a rate of change not less than the predetermined threshold value.

The foregoing and other elements, steps, features, aspects and advantages of the present invention will become more apparent from the following detailed description of preferred embodiments of the present invention when taken in conjunction with the accompanying drawings.

BRIEF DESCRIPTION OF THE DRAWINGS

FIG. 14 is a flowchart showing details of the control mode setting process;

FIG. 19 is a diagram showing an example of the change over time in the acceleration sensor value G2V when the motorized balance board is in the state of experiencing abnormal vibrations;

DETAILED DESCRIPTION OF PREFERRED EMBODIMENTS

A vehicle according to preferred embodiments of the invention will be described below with reference to the drawings.

(1) Configuration of the Motorized Balance Board

Figure 1A:
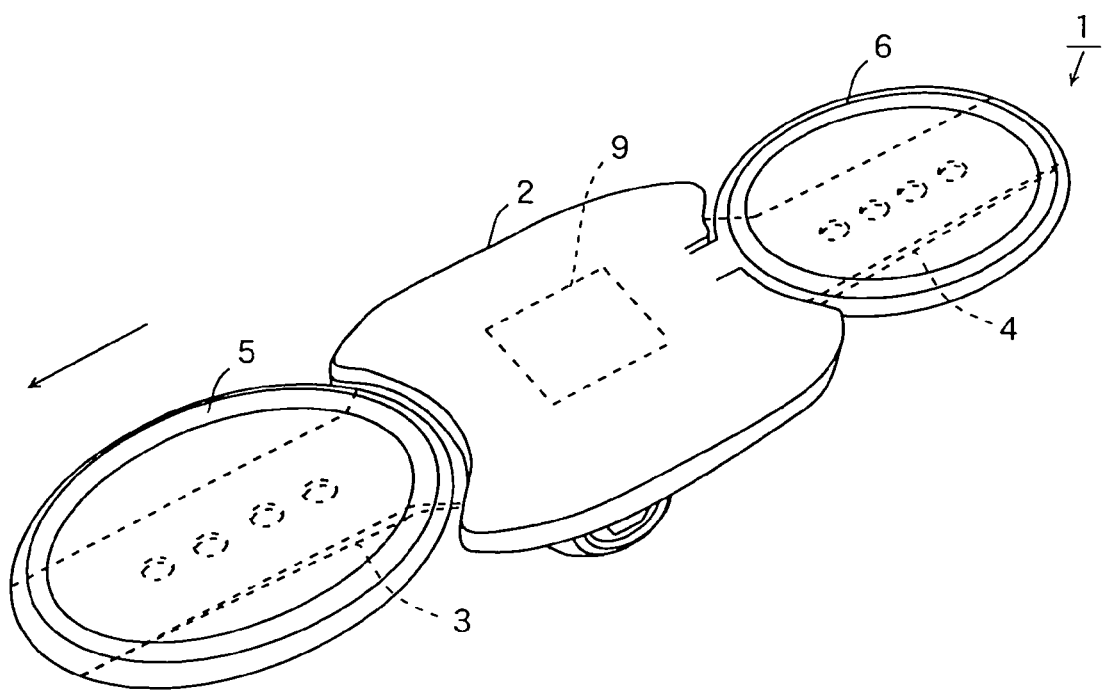
FIGS. 1 (a) and 1 (b) are schematic diagrams each showing the configuration of a vehicle according to a preferred embodiment of the present invention.
Figure 1B:
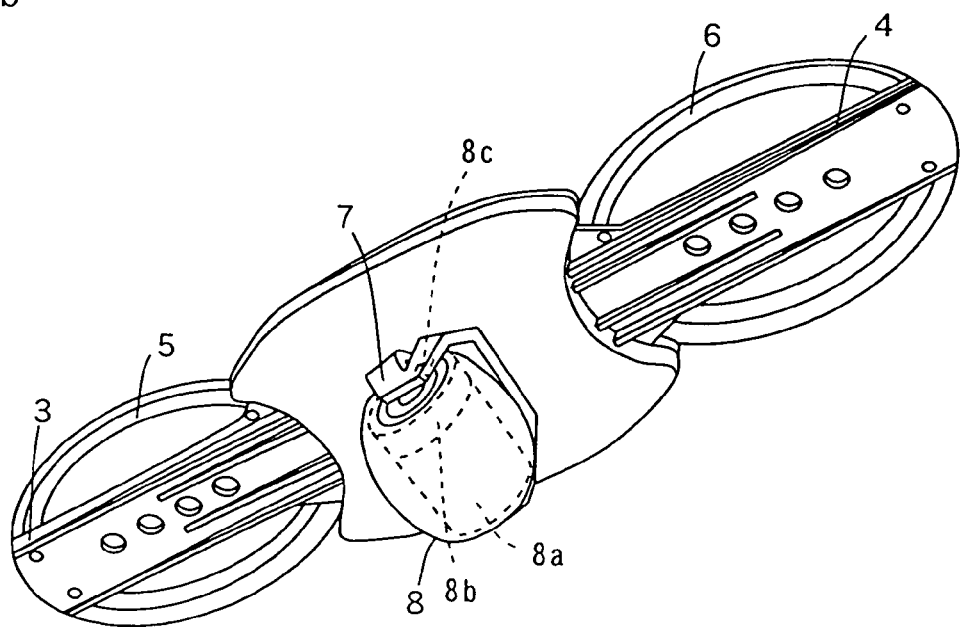

FIGS. 1(a) and 1(b) are schematic diagrams each showing the configuration of a vehicle according to a preferred embodiment of the present invention. A single-wheel motorized balance board 1 is shown in each of FIGS. 1(a) and 1(b) as an example of the vehicle according to a preferred embodiment of the present invention. FIG. 1(a) is a diagram of the motorized balance board 1 viewed obliquely from above, and FIG. 1(b) is a diagram of the motorized balance board 1 viewed obliquely from below. In the specification, the direction indicated by the arrow in FIG. 1(a) defines the front, and the reverse direction defines the back.

As shown in FIGS. 1(a) and 1(b), the motorized balance board 1 has a plate-like main body 2 preferably made of fiber-reinforced plastics (FRP) or wood, for example. The front and rear sides of the main body 2 are provided with a support plate 3 and a support plate 4 that have a relatively long length, respectively. A platform plate 5 and a platform plate 6 that are preferably transparent are attached on the support plate 3 and support plate 4, respectively, at a height substantially equal to that of the main body 2. The main body 2, support plates 3, 4, and platform plates 5, 6 will hereinafter be referred to as a board assembly.

A wheel 8 is arranged on the bottom surface of the main body 2 so as to rotate via a support 7. The wheel 8, which is preferably made of rubber or a resin or other suitable material, for example, preferably includes a motor 8a and reduction mechanism 8b. The reduction mechanism 8b preferably has a planetary gear mechanism, for example. Further, the wheel 8 is provided with a wheel rotation angle detecting sensor 8c. The wheel rotation angle detecting sensor 8c, which preferably includes, for example, a three-phase encoder, detects the rotation angle of the wheel 8. In addition, the wheel 8 has a convex central portion to facilitate turning of a user.

A drive controller 9 is preferably embedded in the central portion of the main body 2. The drive controller 9 drives the motor 8a.

In riding the motorized balance board 1 according to the present preferred embodiment, a user places his or her foot on each of the platform plate 5 and the platform plate 6, while keeping his or her balance on the board assembly with the wheel 8 as a supporting point, with his or her feet aligned along the moving direction (direction of the arrow in FIG. 1(a)). In other words, the motorized balance board 1 is a vehicle in which the board assembly that faces the moving direction can freely incline with the wheel 8 as a supporting point.

Figure 2:
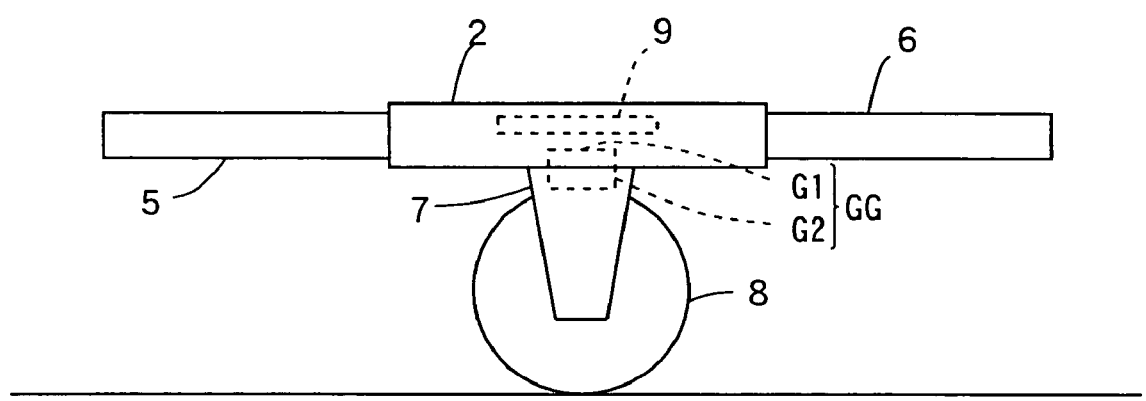
FIG. 2 is a schematic side view of the motorized balance board of FIGS. 1(a) and 1(b)

FIG. 2 is a schematic side view of the motorized balance board 1 of FIG. 1(a) and FIG. 1(b).

As shown in FIG. 2, a position detector GG is arranged below the center of the main body 2. The position detector GG, preferably including a gyrosensor G1 and an acceleration sensor G2, detects the tilt angle of the main body 2. The gyrosensor G1 detects the angular velocity of the main body 2, and the acceleration sensor G2 detects a component in the direction of inclination of the acceleration of gravity acting on the main body 2.

(2) Configuration of the Drive Controller

Figure 3:
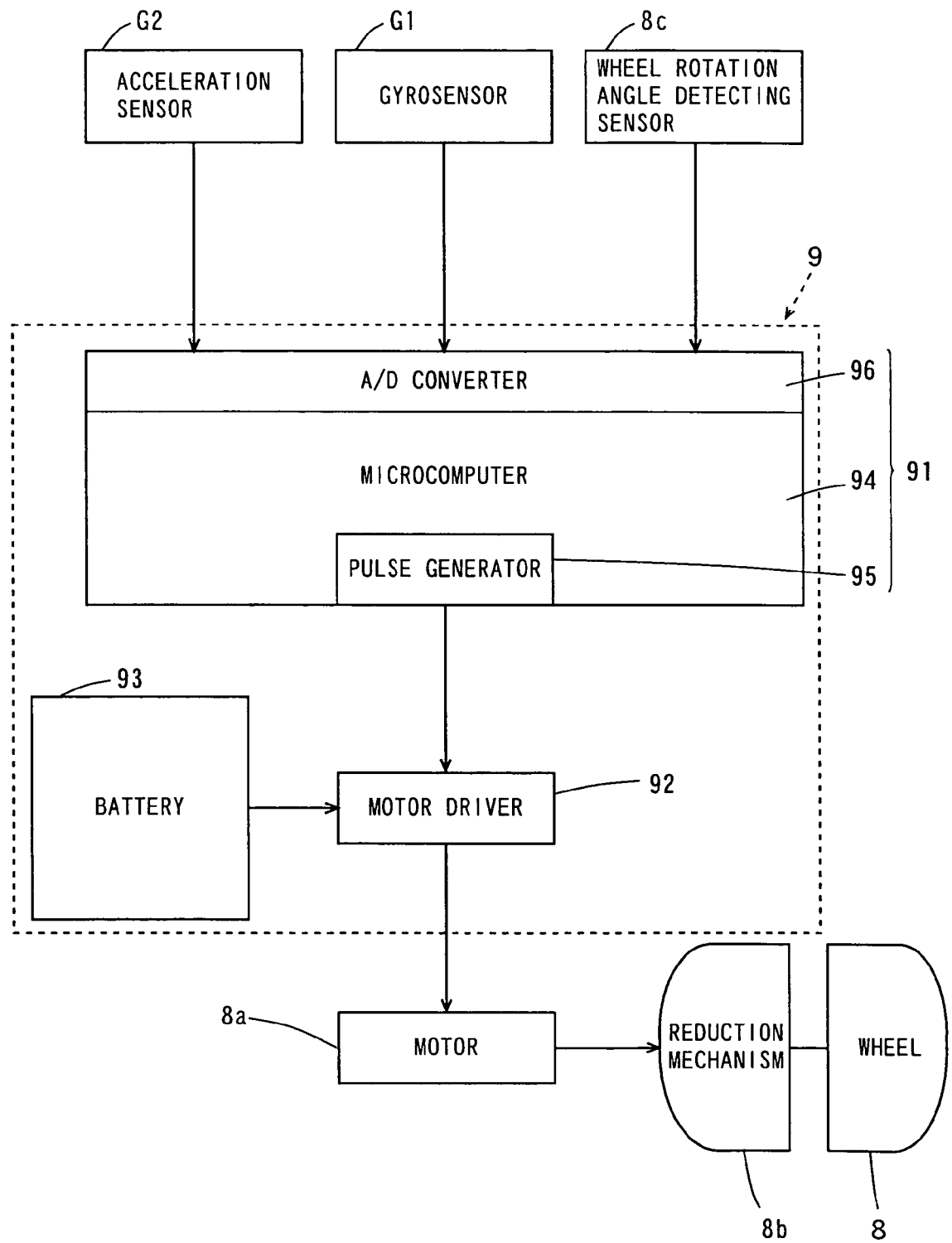
FIG. 3 is a block diagram showing the configuration of the drive controller in the motorized balance board.

Next, the configuration of the drive controller 9 in the motorized balance board 1 will be described with reference to the drawing. FIG. 3 is a block diagram showing the configuration of the drive controller 9 in the motorized balance board 1.

As shown in FIG. 3, the drive controller 9 includes a control unit 91, a motor driver 92, and a battery 93 that supplies power. The control unit 91 preferably includes a microcomputer 94, a pulse generator 95, and an analog-to-digital (A/D) converter 96.

The A/D converter 96 converts analog signals output from the wheel rotation angle detecting sensor 8c, a gyrosensor G1, and an acceleration sensor G2 to digital signals, and supplies the digital signals to the microcomputer 94.

Based on the digital signals obtained from the A/D converter 96, the microcomputer 94 applies a current instruction value that has been pulse-width modulated (PWM) by the pulse generator 95 to the motor driver 92.

Based on the current instruction value from the microcomputer 94, the motor driver 92 causes a drive current to flow in the motor 8a. This causes the motor 8a to drive the wheel 8 via the reduction mechanism 8b.

(3) Microcomputer Processing

Now, control operations performed by the microcomputer 94 in the drive controller 9 will be described with reference to the drawing.

Figure 4:
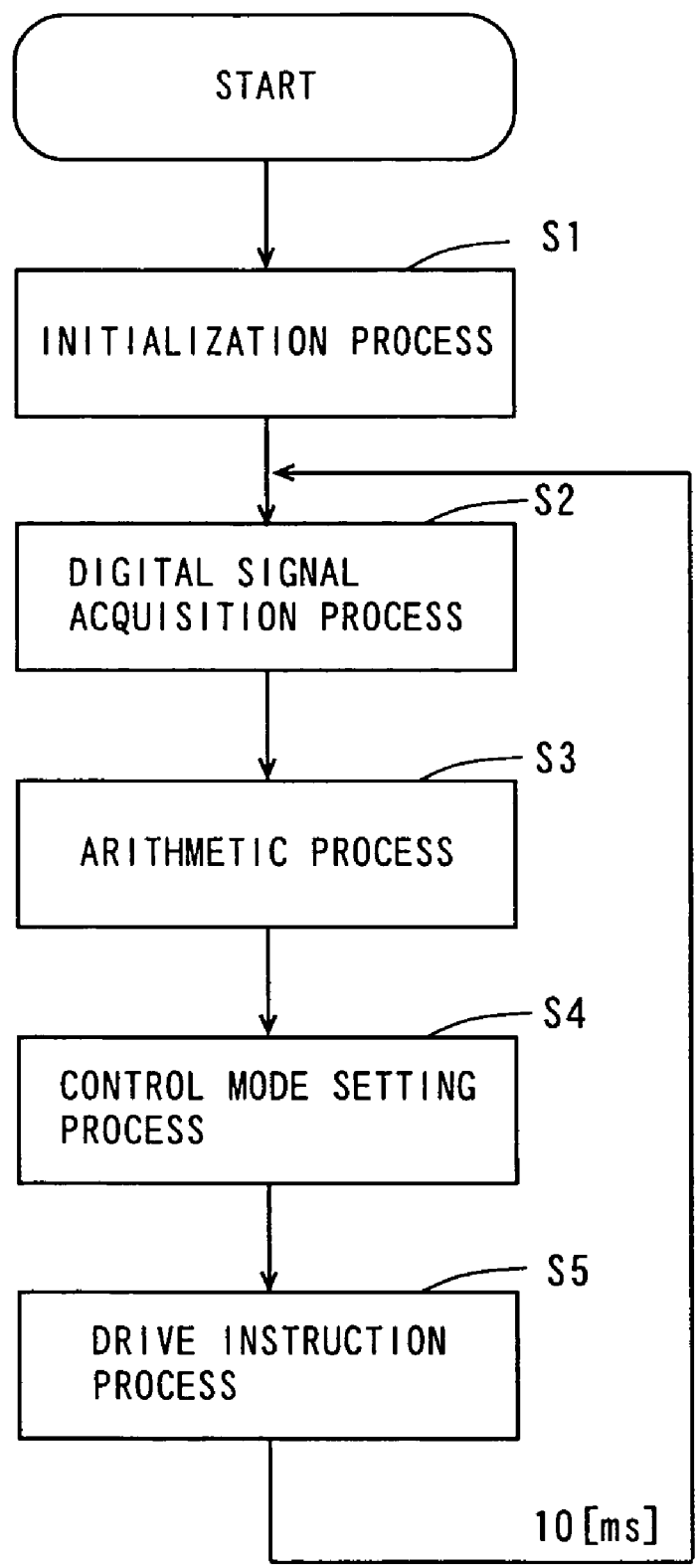
FIG. 4 is a schematic flowchart showing control operations of the microcomputer.

FIG. 4 is a schematic flowchart showing control operations of the microcomputer 94.

As shown in FIG. 4, when a switch (not shown) mounted on the main body 2 is turned on, the microcomputer 94 performs, in sequence, an initialization process (Step S1), a digital signal acquisition process (Step S2), an arithmetic process (Step S3), a control mode setting process (Step S4), and a drive instruction process (Step S5). Subsequent to the drive instruction process at Step S5, the microcomputer 94 returns to the digital signal acquisition process at Step S2, and repeats the processes from Step S2 through Step S5 at predetermined intervals (about 10 msec, for example).

Each of the processes at Steps S1 to S5 is now described.

(3-1) Initialization Process (Step 1)

During the initialization process at Step S1, the microcomputer 94 initializes each of the components in the motorized balance board 1. At Step S1, the current instruction value applied to the motor driver 92 is set to zero.

(3-2) Digital Signal Acquisition Process (Step S2)

During the digital signal acquisition process at Step S2, the microcomputer 94 acquires signals output from the wheel rotation angle detecting sensor 8c, the gyrosensor G1, and the acceleration sensor G2 as digital signals from the A/D converter 96.

(3-3) Arithmetic Process (Step S3)

During the arithmetic process at Step S3, based on the digital signals obtained at Step S2, the microcomputer 94 calculates a rotation angle change value $\Delta\theta w$ of the wheel 8, a tilt angle change value $\Delta\theta b$ of the main body 2, and a tilt angle value $\Delta\theta b$ of the main body 2. The rotation angle change value $\Delta\theta w$ corresponds to the rotation angle of the wheel 8 per a sampling interval (about 10 msec, for example). The tilt angle change value $\Delta\theta b$ corresponds to the amount of the change in the tilt angle of the main body 2 per a sampling interval. The tilt angle value $\theta b$ corresponds to the tilt angle of the main body 2 with respect to the ground. A method of calculating each of the rotation angle change value $\Delta\theta w$, a tilt angle change value $\Delta\theta b$, and a tilt angle value $\theta b$ is now described.

Figure 5:
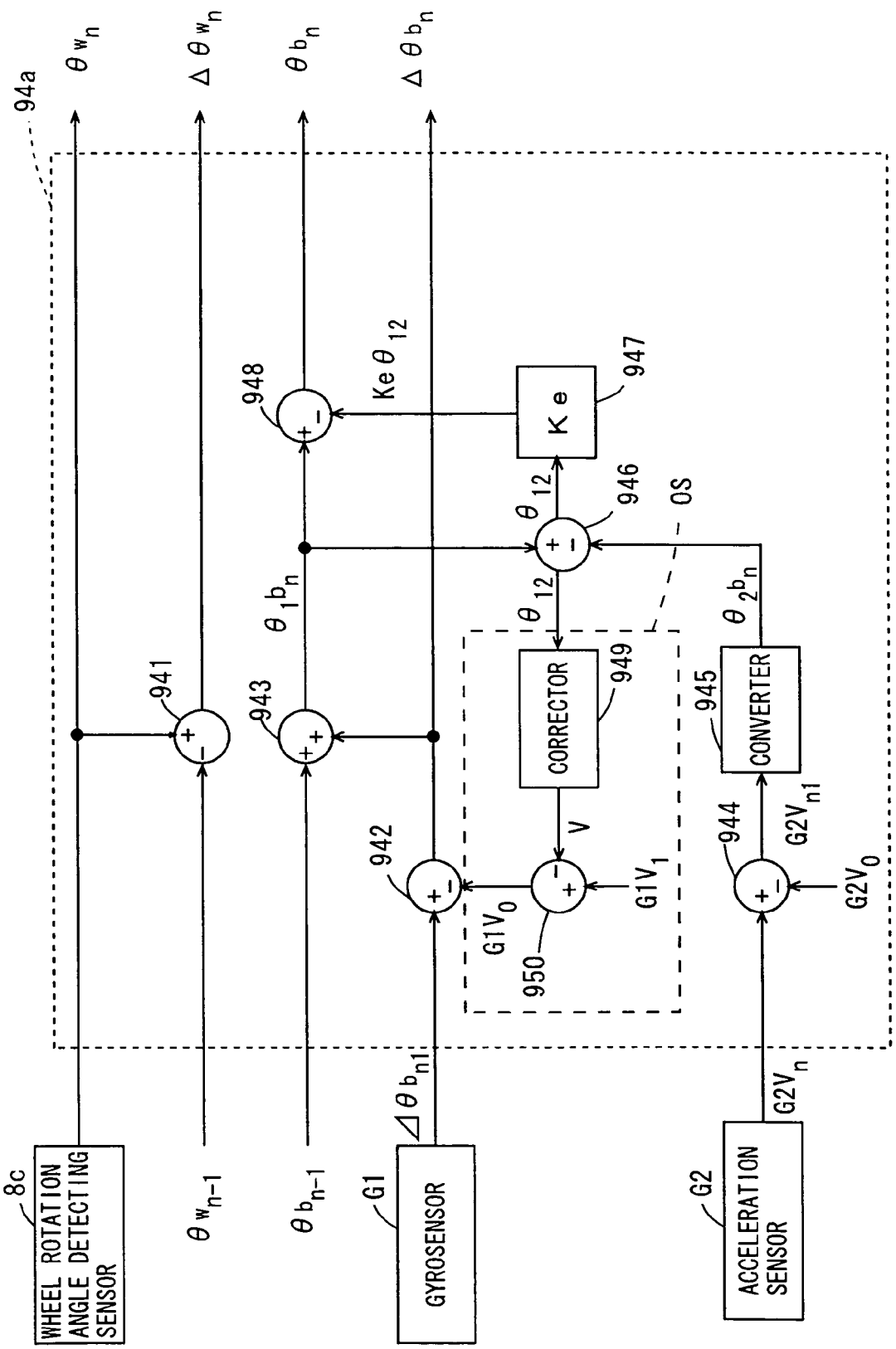
FIG. 5 is a block diagram showing the functional configuration of the arithmetic operation unit that is implemented by the microcomputer and a control program.

FIG. 5 is a block diagram showing the functional configuration of an arithmetic operation unit 94a that is implemented by the microcomputer 94 and a control program. A method of calculating each of a rotation angle change value $\Delta\theta w_n$, a tilt angle change value $\Delta\theta b_n$, and a tilt angle value $\theta b_n$ at the time of an arbitrary sampling is now described. Although the A/D converter 96 is not shown in FIG. 5, signals output from the wheel rotation angle detecting sensor 8c, the gyrosensor G1, and the acceleration sensor G2, respectively, pass through the A/D converter 96 to be applied to the arithmetic operation unit 94a.

(a) Calculation of the Rotation Angle Change Value $\Delta\theta w$

As shown in FIG. 5, a signal that corresponds to the rotation angle of the wheel 8 with respect to the reference angle that is formed when the motorized balance board 1 is powered is input from the wheel rotation angle detecting sensor 8c to the arithmetic operation unit 94a as a rotation angle value $\theta w_n$. The arithmetic element 941 subtracts a rotation angle value $\theta w_{n-1}$ that was detected during the last sampling from the rotation angle value $\theta w_n$. This allows the rotation angle change value $\Delta\theta w_n$ of the wheel 8 to be calculated.

In the specification, the direction of rotation of the wheel 8 when the motorized balance board 1 moves forward is defined as a positive rotation, and the reverse is defined as a negative rotation. It subsequently follows that the rotation angle change value $\Delta\theta w$ is a positive value when the wheel 8 is rotating in the positive or forward direction, and the rotation angle change value $\Delta\theta w$ is a negative value when the wheel 8 is rotating in the negative or reverse direction. Similarly, when the motorized balance board 1 has moved forward relative to its position when it was powered, the rotation angle value $\theta w$ is a positive value, and when the motorized balance board 1 has moved backward, the rotation angle value $\theta w$ is a negative value.

(b) Calculation of the Tilt Angle Change Value $\Delta\theta b$

A signal that corresponds to the amount of the change in the tilt angle of the main body 2 during the sampling interval is input from the gyrosensor G1 to the arithmetic operation unit 94a as a first tilt angle change value $\Delta\theta b_{n1}$.

The arithmetic element 942 subtracts an offset value G1V$_0$ of the gyrosensor G1 from a first tilt angle change value $\Delta\theta b_{n1}$. This allows the tilt angle change value $\Delta\theta b_n$ of the main body 2 during the sampling interval to be calculated. Note that the calculation of the offset value G1V$_0$ is performed in an offset value computing element OS. The offset value computing element OS will be described below.

The tilt angle change value $\Delta\theta b$ is a positive value when the front side of the board assembly (i.e., main body 2) inclines towards the ground. Conversely, the tilt angle change value $\Delta\theta b$ is a negative value when the rear side of the board assembly (i.e., main body 2) inclines towards the ground.

(c) Calculation of the Tilt Angle Value $\theta b$

In the present preferred embodiment, the tilt angle value $\theta b$ is calculated using a first tilt angle value $\theta_1 b$ obtained based on the signal output from the gyrosensor G1, and a second tilt angle value $\theta_2 b$ obtained based on the signal output from the acceleration sensor G2. A method of calculating the tilt angle value $\theta b$ is now described.

(c-1) Calculation of the First Tilt Angle Value $\theta_1 b$

The arithmetic element 943 adds the tilt angle change value $\Delta\theta b_n$ previously calculated to the tilt angle value $\theta b_{n-1}$ that was calculated during the last sampling, so as to obtain the first tilt angle value $\theta_1 b_n$.

(c-2) Calculation of the Second Tilt Angle Value $\theta_2 b$

A signal that corresponds to the tilt angle of the main body 2 is input from the acceleration sensor G2 to the arithmetic operation unit 94a as an acceleration sensor value G2V$_n$. As described above, the acceleration sensor G2 used in the present preferred embodiment detects a component in the direction of inclination of the acceleration of gravity acting on the main body 2. The acceleration sensor value G2V$_n$ increases and decreases according to the tilt angle of the main body 2.

The arithmetic element 944 subtracts an offset value G2V$_0$ of the acceleration sensor G2 from the acceleration sensor value G2V$_n$, so as to obtain an acceleration sensor value G2V$_{n1}$. After that, a converter 945 converts the acceleration sensor value G2V$_{n1}$ to the second tilt angle value $\theta_2 b_n$.

(c-3) Calculation of the Tilt Angle $\theta b_n$

In calculating the above-mentioned first tilt angle $\theta_1 b_n$, the tilt angle change value $\Delta\theta b_n$ calculated based on the signal output from the gyrosensor G1 is added for each sampling. In this case, each signal output from the gyrosensor G1 includes an error, leading to accumulation of errors in the first tilt angle $\theta_1 b_n$ for each sampling. Thus, the first tilt angle $\theta_1 b_n$ is not indicative of a correct tilt angle of the main body 2.

Meanwhile, the above-mentioned second tilt angle $\theta_2 b_n$ is calculated based on the signal output from the acceleration sensor G2. Note that the signal output from the acceleration sensor G2 is greatly affected by an inertial force. Thus, if the tilt angle of the main body 2 is calculated based on a signal output from the acceleration sensor G2 when an inertial force is acting greatly on the acceleration sensor G2, i.e., with the main body 2 inclining at high speed, or when the motorized balance board 1 is moving forward or backward at high speed, this causes a very significant error. For this reason, the second tilt angle $\theta_2 b_n$ is not indicative of a correct tilt angle value of the main body 2.

Thus, an approach to this problem involves first, calculating the difference between the first tilt angle value $\theta_1 b_n$ and the second tilt angle value $\theta_2 b_n$ (hereinafter referred to as a differential value $\theta_{12}$) in the arithmetic element 946; then, multiplying the above-mentioned differential value $\theta_{12}$ with a correction coefficient Ke in the arithmetic element 947, thereby producing a correction value Ke$\theta_{12}$; lastly, subtracting the correction value Ke$\theta_{12}$ from the first tilt angle value $\theta_1 b_n$ in the arithmetic element 948. This provides for correction of errors generated by the gyrosensor G1 and the acceleration sensor G2, thus achieving the tilt angle value $\theta b_n$ of the main body 2. Note that the correction coefficient Ke can be obtained through experiments. The correction efficient Ke may, for example, be approximately 0.01.

The tilt angle value $\theta b$ is zero when the board assembly (main body 2) is kept horizontal to the ground; a positive value when the front side of the board assembly (main body 2) is inclining towards the ground relative to the horizontal direction; and a negative value when the rear side of the board assembly (main body 2) is inclining towards the ground relative to the horizontal direction.

(d) Offset value computing element OS

Now, the offset value computing element OS is briefly described.

In FIG. 5, G1V$_1$ defines an offset value of the gyrosensor G1 when the motorized balance board 1 is powered. The gyrosensor, in general, is susceptible to changes in temperature, giving rise to changes in the offset value G1V$_1$ with changing temperature. This causes an error of measurement due to ambient temperature in adjusting the offset by subtracting the offset value G1V$_1$ from the signal output from the gyrosensor G1. In order to compensate for such a measurement error, the corrector 949 in the offset value computing element OS calculates a temperature correction value V based on the differential value $\theta_{12}$. Then, the arithmetic element 950 subtracts the temperature correction value V from the offset value G1V$_1$. This provides for correction of an error in the offset value G1V$_1$ due to a change in temperature, thus achieving the offset value G1V$_0$ that is dependent on changes in temperature.

(3-4) Control Mode Setting Process (Step S4)

During the control mode setting process at Step S4, the microcomputer 94 chooses one of a plurality of control modes, i.e., preparatory mode, standby mode, riding mode, rising mode, and balance stabilized mode.

Figure 6:
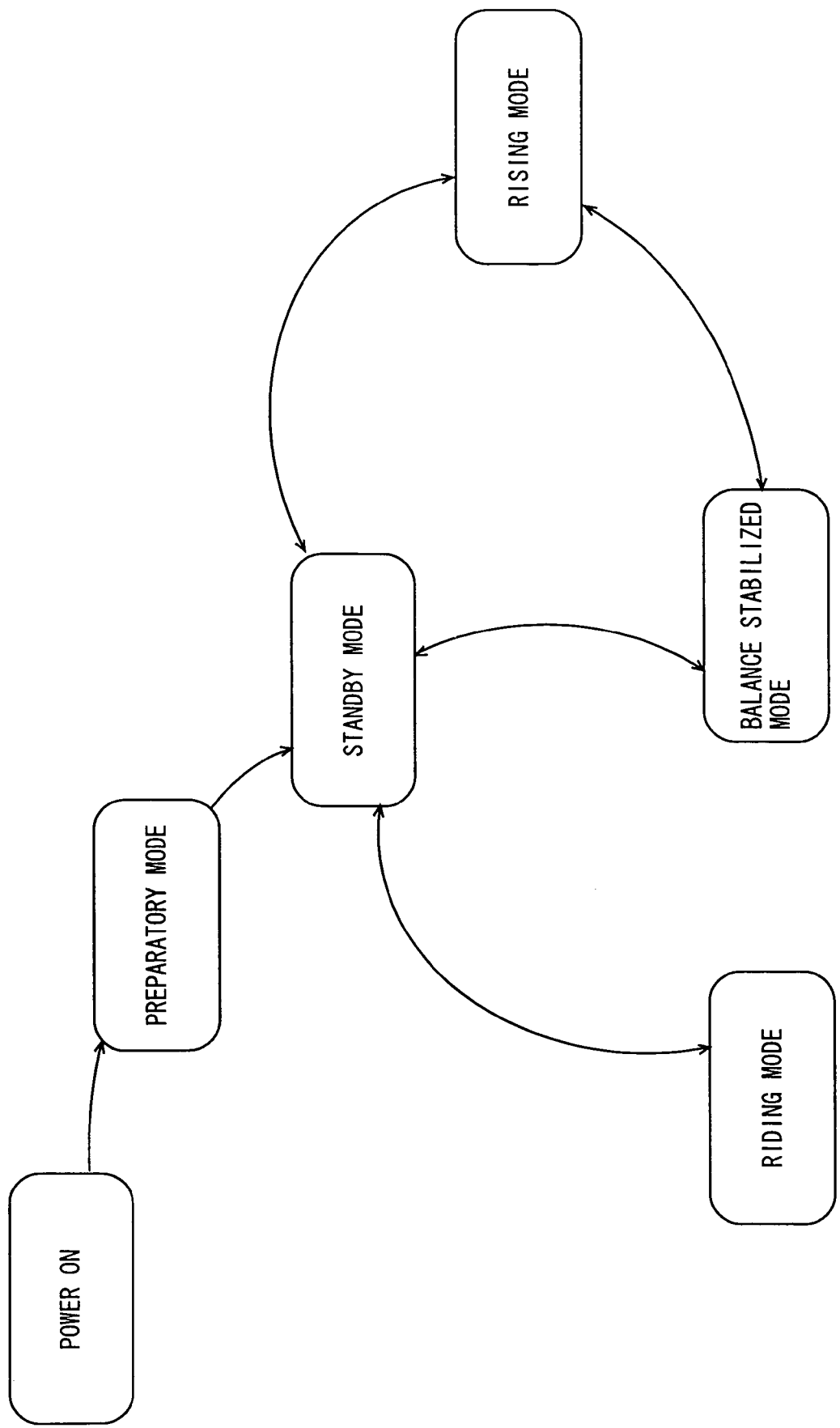
FIG. 6 is a block diagram showing the relationship among the respective control modes.

FIG. 6 is a block diagram showing the relationship among the respective control modes.

As shown in FIG. 6, when the motorized balance board 1 is powered, the microcomputer 94 first sets the control mode to the preparatory mode for the motorized balance board 1. The preparatory mode involves ensuring the time to stabilize outputs from the respective components in the motorized balance board 1.

After that, the microcomputer 94 changes the control mode to the standby mode or continues to be in the preparatory mode. Conditions for changing the control mode will be discussed below.

In the standby mode, the microcomputer 94 determines whether a user has mounted the motorized balance board 1 or not, and chooses a control mode in accordance with the determination.

Next, the microcomputer 94 changes the control mode to any of the riding mode, rising mode, and balance stabilized mode, or continues to be in the standby mode.

In the riding mode, upon ascent and mounting of the user onto the motorized balance board 1, the microcomputer 94 causes the motorized balance board 1 to move or stop in accordance with the user's will. When the control mode is the riding mode, the microcomputer 94 changes the control mode to the standby mode or continues to be in the riding mode.

In the rising mode, when the user is not aboard the motorized balance board 1, the microcomputer 94 causes the platform plate 5 or platform plate 6 of the motorized balance board 1 (see FIG. 1) to be raised from the ground, so as to place the board assembly (main body 2 and platforms 5, 6) in a horizontal position relative to the ground. When the control mode is the rising mode, the microcomputer 94 changes the control mode to the balance stabilized mode or the standby mode or continues to be in the rising mode.

In the balance stabilized mode, the board assembly which has been placed horizontal to the ground in the rising mode is kept horizontal to the ground for a predetermined period. When the control mode is the balance stabilized mode, the microcomputer 94 changes the control mode to the standby mode or continues to be in the balance stabilized mode.

In the present preferred embodiment, the user can recognize, from the motion and controlled position of the board assembly in the rising mode and the balance stabilized mode, that the motorized balance board 1 is being powered without the user aboard the motorized balance board 1. This prevents the motorized balance board 1 from being left in the on state when not in use.

(a) Drive Instruction Torque for Each Mode

Now, the drive instruction torque T on the motor 8a for each of the control modes is described.

In the present preferred embodiment, the drive instruction torque T applied to the motor 8a in each of the control modes is determined, based on the tilt angle change value $\Delta\theta b$, tilt angle value $\theta b$, rotation angle change value $\Delta\theta w$, and rotation angle value $\theta w$ that are described in FIG. 5. The microcomputer 94 provides a current instruction value that corresponds to the drive instruction torque T to the motor driver 92. When the drive instruction torque T is a positive value, the torque is applied in the direction of positive or forward rotation of the wheel 8. When the drive instruction torque T is a negative value, the torque is applied in the direction of negative or reverse rotation of the wheel 8.

Table 1 shows the relationship between each of the control modes and the drive instruction torque T.

TABLE 1

| Control mode | Drive instruction torque |
| --- | --- |
| Preparatory mode | T = 0 |
| Standby mode | T = K$_{1d}$ · $\Delta\theta w$ |
| Riding mode | T = K$_{2a}$ · $\theta b$ + K$_{2b}$ · $\Delta\theta b$ + K$_{2d}$ · $\Delta\theta w$ |
| Rising mode | T = K$_{3a}$ · $\theta b$ + K$_{3b}$ · $\Delta\theta b$ |
| Balance stabilized mode | T = K$_{4a}$ · $\theta b$ + K$_{4b}$ · $\Delta\theta b$ + K$_{4c}$ · $\theta w$ + K$_{4d}$ · $\Delta\theta w$ |

(a-1) Preparatory Mode

As shown in Table 1, in the preparatory mode, the drive instruction torque T on the motor 8a is set to zero. In other words, the motorized balance board 1 is stationary in the preparatory mode.

(a-2) Standby Mode

As shown in Table 1, in the standby mode, the drive instruction torque T on the motor 8a is determined by the following equation (1):

$$T = K_{1d} \cdot \Delta\theta w, \quad (1)$$

where K$_{1d}$ is a negative coefficient. Thus, the drive instruction torque T is a negative value when the rotation angle change value $\Delta\theta w$ is positive, and it is a positive value when the rotation angle change value $\Delta\theta w$ is negative. That is, in the standby mode, torque is applied in the reverse direction of rotation of the wheel 8. This allows the motorized balance board 1 to brake to a halt. Further, when the wheel 8 is not rotating, the value of the drive instruction torque T is zero while the motorized balance board 1 maintains its stationary state.

(a-3) Riding mode

As shown in Table 1, in the riding mode, the drive instruction torque T on the motor 8a is determined by the following equation (2):

$$T = K_{2a} \cdot \theta b + K_{2b} \cdot \Delta \theta b + K_{2d} \cdot \Delta \theta w, \quad (2)$$

where $K_{2a}$, $K_{2b}$, and $K_{2d}$ are positive coefficients.

In this case, while aboard the motorized balance board 1, the user is allowed to determine the moving direction and velocity of the motorized balance board 1 by inclining the board assembly (main body 2) and arbitrarily adjusting the tilt angle change value $\Delta \theta b$ and tilt angle value $\theta b$. In addition, the rotation angle change value $\Delta \theta w$ can be fed back to the drive instruction torque T, which results in smooth adjustment of velocity.

(a-4) Rising Mode

As shown in Table 1, in the rising mode, the drive instruction torque T on the motor 8a is determined by the following equation (3):

$$T = K_{3a} \cdot \theta b + K_{3b} \cdot \Delta \theta b, \quad (3)$$

where $K_{3a}$ and $K_{3b}$ are positive coefficients.

Note that the tilt angle value $\theta b$ is positive when the front side of the board assembly (platform plate 5) is in contact with the ground, while it is negative when the rear side of the board assembly (platform plate 6) is in contact with the ground. That is, with the platform plate 5 in contact with the ground, the wheel 8 rotates in the positive or forward direction to raise the platform plate 5 from the ground. Conversely, with the platform plate 6 in contact with the ground, the wheel 8 rotates in the negative or reverse direction to raise the platform plate 6 from the ground.

If the positive rotation of the wheel 8 causes the platform plate 5 to be raised from the ground so as to incline upwardly from the horizontal direction, then the tilt angle value $\theta b$ becomes negative to cause the wheel 8 to rotate in the negative or reverse direction. Conversely, if the reverse rotation of the wheel 8 causes the platform plate 6 to be raised from the ground so as to incline upwardly from the horizontal direction, then the tilt angle value $\theta b$ becomes positive to cause the wheel 8 to rotate in the positive or forward direction.

In other words, when the front side of the board assembly is close to the ground, the wheel 8 rotates in the positive or forward direction to cause the front side of the board assembly to be raised. Conversely, when the rear side of the board assembly is close to the ground, the wheel 8 rotates in the negative or reverse direction to cause the rear side of the board assembly to be raised. This brings the board assembly horizontal relative to the ground.

(a-5) Balance stabilized Mode

As shown in Table 1, in the balance stabilized mode, the drive instruction torque T on the motor 8a is determined by the following equation (4):

$$T = K_{4a} \cdot \theta b + K_{4b} \cdot \Delta \theta b + K_{4c} \cdot \theta w + K_{4d} \cdot \Delta \theta w, \quad (4)$$

where $K_{4a}$, $K_{4b}$, $K_{4c}$, and $K_{4d}$ are positive coefficients.

In this case, the motorized balance board 1 is capable of keeping its position when it was powered with its board assembly horizontal to the ground.

(b) Details of Control Mode Setting Process (Step S4)

The control mode setting process at Step 4 will be described in further detail below with reference to the drawing.

Figure 7:
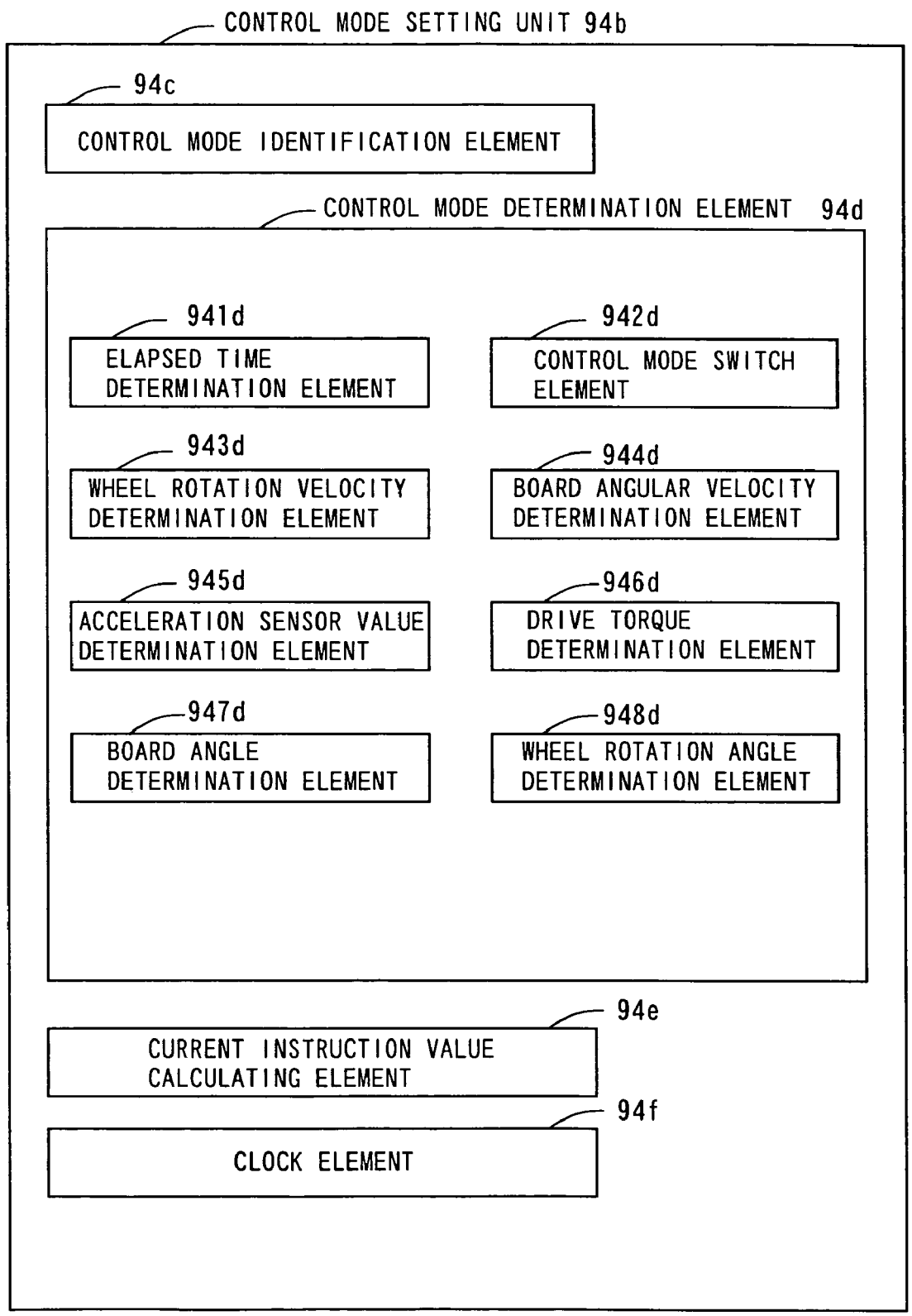
FIG. 7 is a block diagram showing the functional configuration of the control mode setting unit that is implemented by the microcomputer and a control program.

FIG. 7 is a block diagram showing the functional configuration of a control mode setting unit 94b that is implemented by the microcomputer 94 and a control program. FIG. 8, FIG. 9, FIG. 10, FIG. 11, FIG. 12, FIG. 13, FIG. 14, and FIG. 15 are flowcharts, each showing details of the control mode setting process.

As shown in FIG. 7, the control mode setting unit 94b preferably includes a control mode identification element 94c, a control mode determination element 94d, a current instruction value calculating element 94e, and a clock element 94f. The control mode determination element 94d preferably includes an elapsed time determination element 941d, a control mode switch element 942d, a wheel rotation velocity determination element 943d, a board angle velocity determination element 944d, an acceleration sensor value determination element 945d, a drive torque determination element 946d, a board angle determination element 947d, and a wheel rotation angle determination element 948d. Referring to the drawings, the process performed by each of these components in the control mode setting unit 94b will be described.

Figure 8:
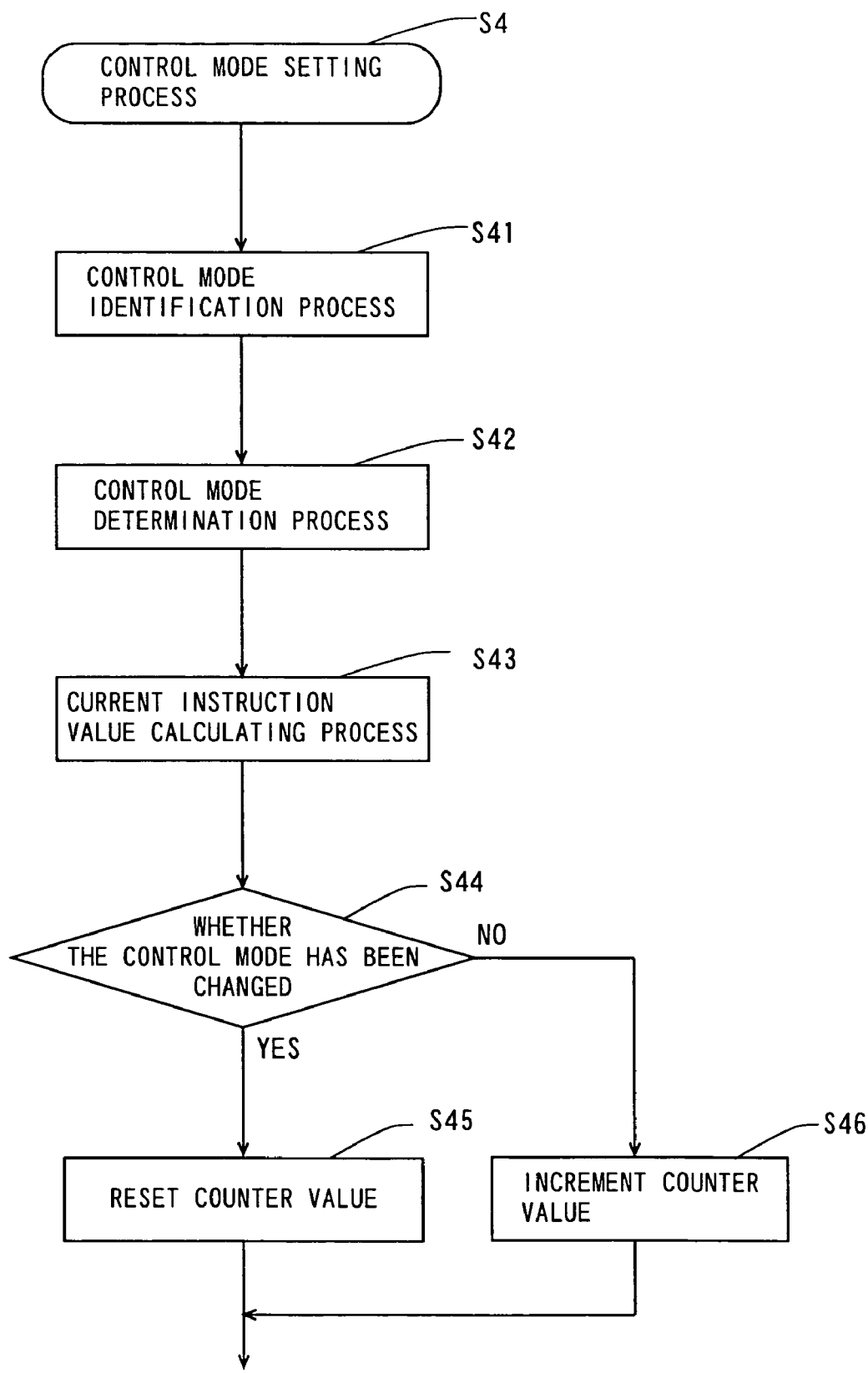
FIG. 8 is a flowchart showing details of the control mode setting process.

As shown in FIG. 8, in the control mode setting process, the control mode identification element 94c first performs the process of identifying the control mode (Step S41). The control mode identification process involves identifying the current control mode, as will be described below.

Next, the control mode determination element 94d performs the process of determining the control mode (Step S42). The control mode determination process involves determining the control mode based on a variety of determinations made by the respective components in the control mode determination element 94d, as will be described below.

Then, the current instruction value calculating element 94e calculates the drive instruction torque T for the control mode that has been determined at Step S42, and calculates the current instruction value that corresponds to the drive instruction torque T obtained (Step S43).

Then, the control mode identification element 94c determines whether the control mode was changed or not at Step S42 (Step S44). When the control mode was changed, the clock element 94f resets the counter value for time management (Step S45). The microcomputer 94 subsequently proceeds to the process at Step S5 in FIG. 4.

When the control mode was not changed at Step S44, the clock element 94f increments the counter value (Step S46). After this, the microcomputer 94 proceeds to the process at Step S5 in FIG. 4.

Now, the control mode identification process at Step S41 and the control mode determination process at Step S42 will be described in detail with reference to the drawings.

(b-1) Control Mode Identification Process (Step S41)

Figure 9:
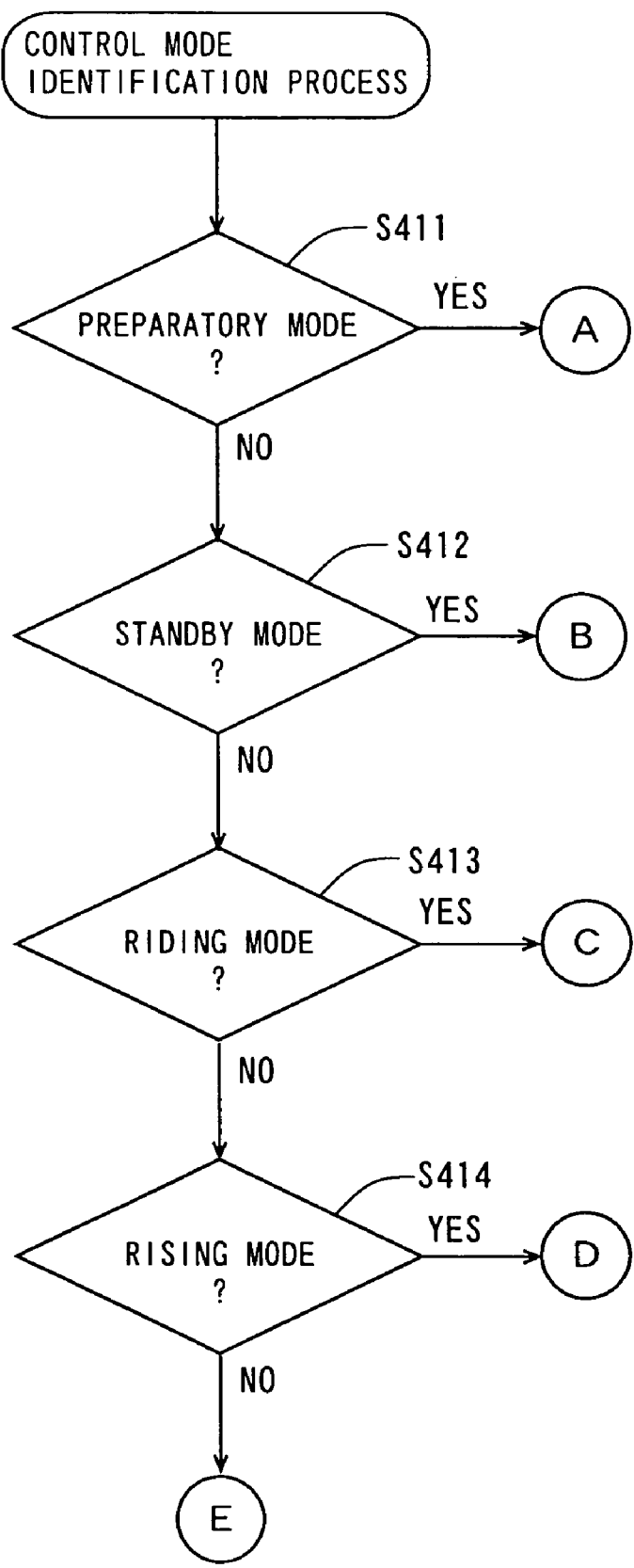
FIG. 9 is a flowchart showing details of the control mode setting process.

As shown in FIG. 9, in the control mode identification process, the control mode identification element 94c (see FIG. 7) first determines whether the current control mode is the preparatory mode or not (Step S411). In the case of the preparatory mode, the microcomputer 94 proceeds to the process at Step S421, as will be described below (see FIG. 10).

When the current control mode is not the preparatory mode at Step S411, the control mode identification element 94c determines whether the current control mode is the standby mode or not (Step S412). In the case of the standby mode, the microcomputer 94 proceeds to the process at Step S424, as will be described below (see FIG. 11).

When the current control mode is not the standby mode at Step S412, the control mode identification element 94c determines whether the current control mode is the riding mode or not (Step S413). In the case of the riding mode, the microcomputer 94 proceeds to the process at Step S430, as will be described below (see FIG. 12).

When the current control mode is not the riding mode at Step S413, the control mode identification element 94c determines whether the current control mode is the rising mode or not (Step S414). In the case of the rising mode, the microcomputer 94 proceeds to the process at Step S438, as will be described below (see FIG. 14).

When it is determined in the process of Step S414 that the current control mode is not the rising mode, which means that the control mode identification element 94c determines that the control mode is currently the balance stabilized mode, then the microcomputer 94 proceeds to the process at Step S443, as will be described below (see FIG. 15).

(b-2) Control Mode Determination Process (Step S42)

Figure 10:
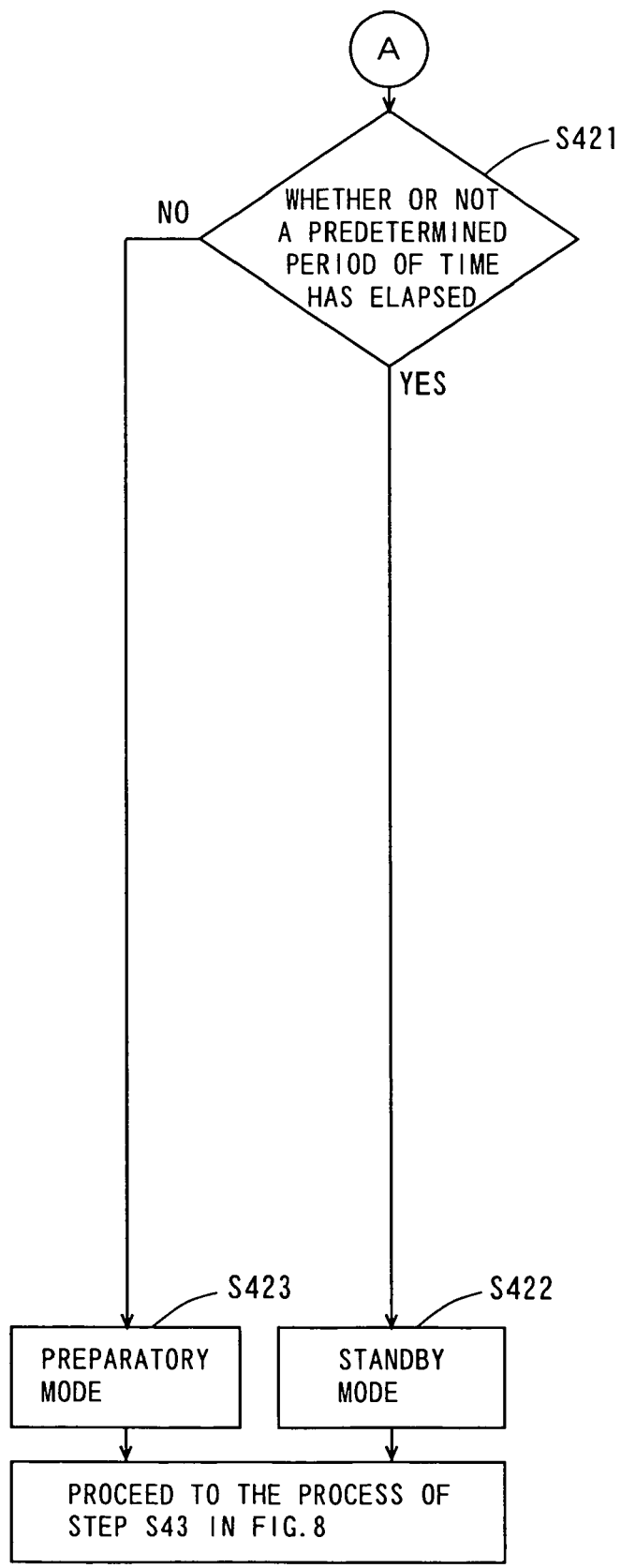
FIG. 10 is a flowchart showing details of the control mode setting process.

When the control mode is the preparatory mode at Step S411 in FIG. 9, then as shown in FIG. 10, in the control mode determination process, the elapsed time determination element 941d (see FIG. 7) determines whether a predetermined period (for example, about 0.5 sec) has elapsed or not (Step S421). The process of Step S421 is provided to ensure the time until outputs from the respective components in the motorized balance board 1 are stabilized after the motorized balance board 1 has been powered. Note that the control mode is set to the preparatory mode immediately after the motorized balance board 1 is powered.

When the predetermined period has elapsed at Step S421, the microcomputer 94 determines that outputs from the respective components in the motorized balance board 1 have stabilized. In this case, the control mode switch element 942d (see FIG. 7) switches the control mode to the standby mode (Step S422). After that, the microcomputer 94 proceeds to the process at Step S43 in FIG. 8.

When the predetermined period has not elapsed in the process of Step S421, the microcomputer 94 determines that outputs from the respective components in the motorized balance board 1 have yet to be stabilized. In this case, the control mode switch element 942d continues to be in the preparatory mode (Step S423). After that, the microcomputer 94 proceeds to the process at Step S43 in FIG. 8.

Figure 11:
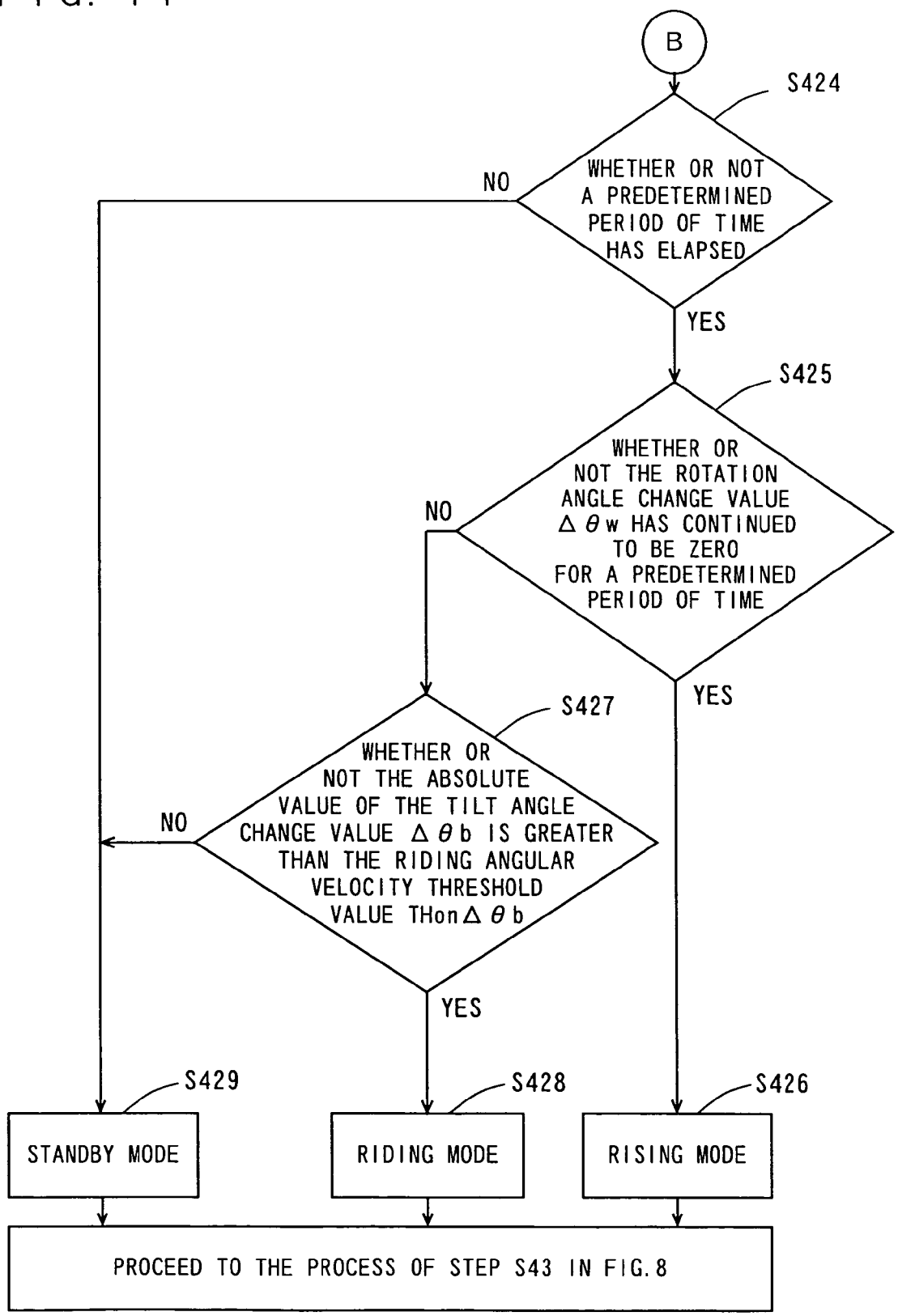
FIG. 11 is a flowchart showing details of the control mode setting process.

When the control mode is the standby mode at Step S412 in FIG. 9, the elapsed time determination element 941d determines whether a predetermined period (for example, about 0.5 sec) has elapsed or not, as shown in FIG. 11 (Step S424). The process of Step S424 is provided to ensure the time until outputs from the respective components in the motorized balance board 1 are stabilized after the control mode has been switched to the standby mode from another mode.

When the predetermined period has elapsed at Step S424, the microcomputer 94 determines that outputs from the respective components of the motorized balance board 1 have stabilized. In this case, the wheel rotation velocity determination element 943d and the elapsed time determination element 941d (see FIG. 7) determine whether or not the rotation angle change value $\Delta\theta w$ (the velocity of the motorized balance board 1) has continued to be zero for a predetermined period (for example, three sec) (Step S425). When the rotation angle change value $\Delta\theta w$ has continued to be zero for the predetermined period, the microcomputer 94 determines that the user is not aboard the motorized balance board 1. In this case, the control mode switch element 942d switches the control mode to the rising mode (Step S426). After that, the microcomputer 94 proceeds to the process at Step S43 in FIG. 8.

When at Step S425, the rotation angle change value $\Delta\theta w$ is not zero or when the rotation angle change value $\Delta\theta w$ has not continued to be zero for the predetermined time, the board angular velocity determination element 944d (see FIG. 7) determines whether or not the absolute value of the tilt angle change value $\Delta\theta b$ is greater than a riding angular velocity threshold $TH on\Delta\theta b$ (Step S427). When the absolute value of the tilt angle change value $\Delta\theta b$ is greater than the riding angular velocity threshold $TH on\Delta\theta b$, the microcomputer 94 determines that the user is aboard the motorized balance board 1, intentionally raising the front or rear side of the board assembly from the ground for traveling on the motorized balance board 1. In this case, the control mode switch element 942d switches the control mode to the riding mode (Step S428). After that, the microcomputer 94 proceeds to the process at Step S43 in FIG. 8. Note that the riding angular velocity threshold $TH on\Delta\theta b$ is set such that the absolute value of the tilt angle change value $\Delta\theta b$ is greater than the riding angular velocity threshold $TH on\Delta\theta b$ when the tilt angular velocity of the main body 2 is about 180°/s or greater, for example.

When the predetermined time has not elapsed at Step S424, then the microcomputer 94 determines that outputs from the respective components of the motorized balance board 1 have yet to be stabilized. In this case, the control mode switch element 942d continues the standby mode (Step S429). After that, the microcomputer 94 proceeds to the process at Step S43 in FIG. 8.

When at Step S427, the absolute value of the tilt angle change value $\Delta\theta b$ is equal to or smaller than the riding angular velocity threshold $TH on\Delta\theta b$, the microcomputer 94 determines that the user is not intentionally raising the front or rear side of the board assembly from the ground. In this case, the control mode switch element 942d continues the standby mode (Step S429). After that, the microcomputer 94 proceeds to the process at Step S43 in FIG. 8.

Figure 12:
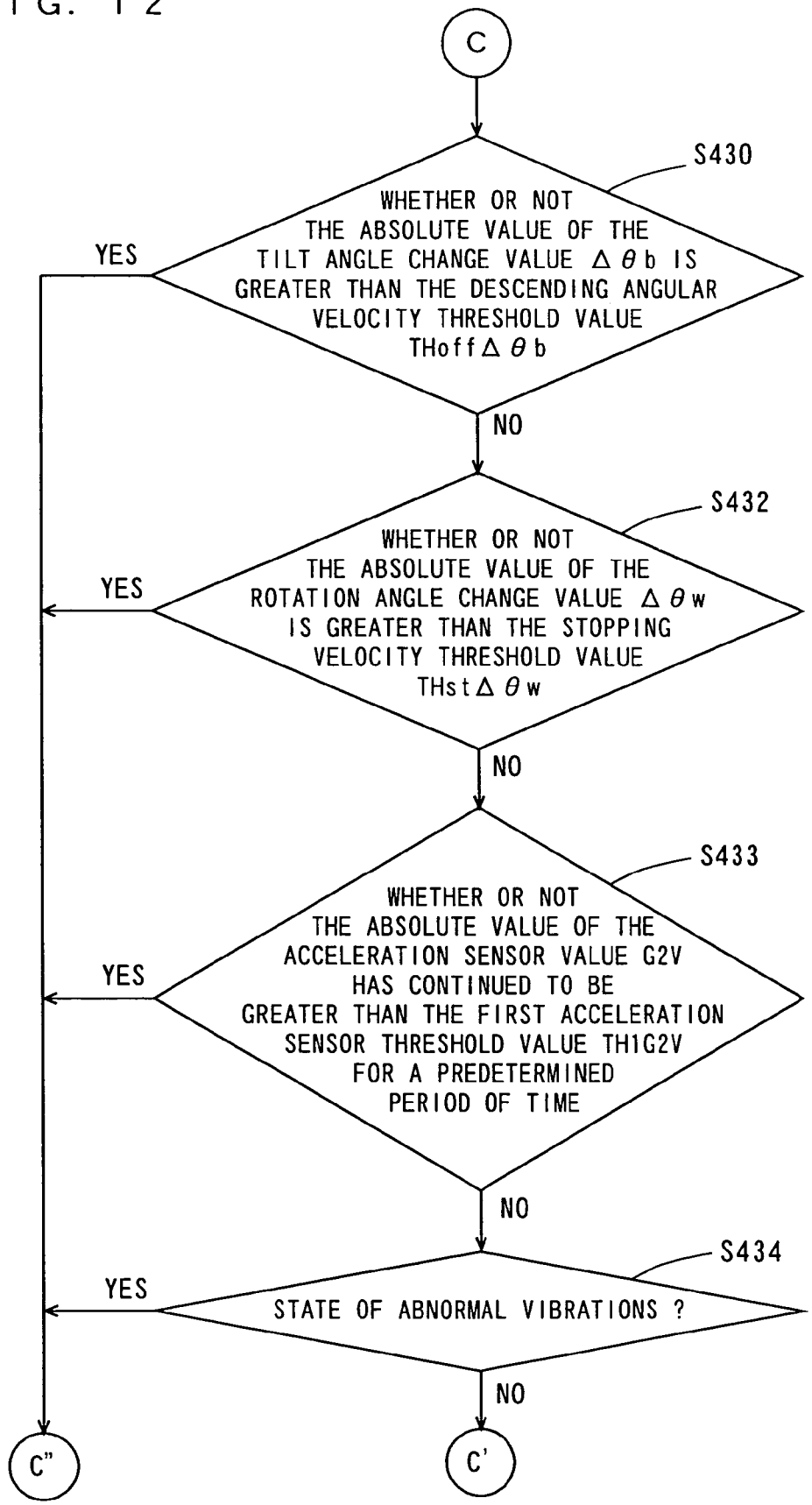
FIG. 12 is a flowchart showing details of the control mode setting process.

When in the process of Step S413 of FIG. 9 it is determined that the control mode is the riding mode, the board angular velocity determination element 944d determines whether or not the absolute value of the tilt angle change value $\Delta\theta b$ is greater than a descending angular velocity threshold $TH off\Delta\theta b$, as shown in FIG. 12 (Step S430). When the absolute value of the tilt angle change value $\Delta\theta b$ is greater than the descending angular velocity threshold $TH off\Delta\theta b$, the microcomputer 94 determines that the user is about to descend and dismount from the motorized balance board 1. In this case, the control mode switch element 942d switches the control mode to the standby mode (Step S431 in FIG. 13). After that, the microcomputer 94 proceeds to the process at Step S43 in FIG. 8. Note that the descending angular velocity threshold $TH off\Delta\theta b$ is set such that the absolute value of the tilt angle change value $\Delta\theta b$ is greater than the descending angular velocity threshold $TH off\Delta\theta b$ when the tilt angular velocity of the main body 2 is about 180°/s or greater, for example.

When at Step S430, the absolute value of the tilt angle change value $\Delta\theta b$ is equal to or smaller than the descending angular velocity threshold $TH off\Delta\theta b$, then the wheel rotation velocity determination element 943d determines whether or not the absolute value of the rotation angle change value $\Delta\theta w$ is greater than a stopping velocity threshold $TH st\Delta\theta w$ (Step S432). When the absolute value of the rotation angle change value $\Delta\theta w$ is greater than the stopping velocity threshold $TH st\Delta\theta w$, the control mode switch element 942d switches the control mode to the standby mode (Step S431 in FIG. 13).

Note that the stopping velocity threshold TH$st\Delta\theta w$ is set such that the rotation angle change value $\Delta\theta w$ is greater than the stopping velocity threshold TH$st\Delta\theta w$ when the moving velocity of the motorized balance board 1 is about 10 km/h or greater, for example. This allows the user to enjoy driving the balance board 1 safely.

When at Step S432, the rotation angle change value $\Delta\theta w$ is equal to or smaller than the stopping velocity threshold TH$st$-$\Delta\theta w$, then the acceleration sensor value determination element 945*d* and the elapsed time determination element 941*d* determine whether or not the absolute value of the acceleration sensor value G2V (see FIG. 5) has continued to be greater than a first acceleration sensor threshold TH1G2V for a predetermined period (for example, about 100 msec) (Step S433).

Figure 16:
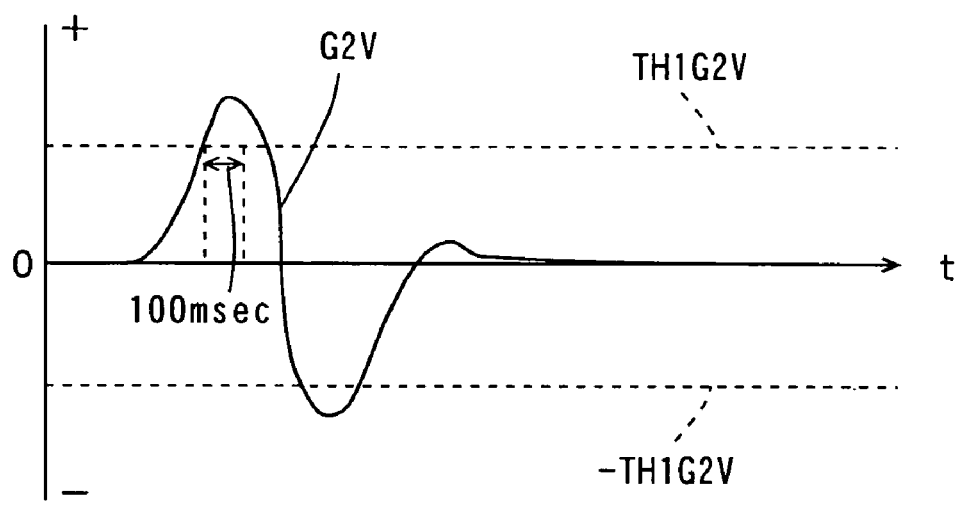
FIG. 16 is a diagram showing an example of the change over time in the acceleration sensor value G2V when the absolute value of the acceleration sensor value G2V has continued to be greater than the first acceleration sensor threshold TH1G2V for a predetermined period.
Figure 17:
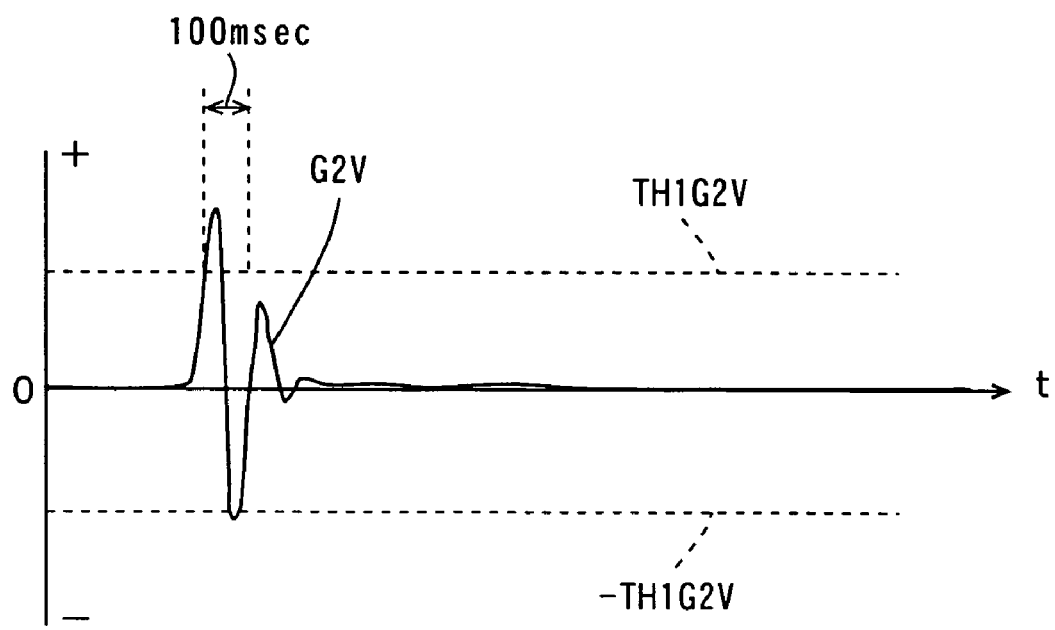
FIG. 17 is a diagram showing an example of the change over time in the acceleration sensor value G2V when the absolute value of the acceleration sensor value G2V fails to continue to be greater than the first acceleration sensor threshold TH1G2V for a predetermined period.

The process of Step S433 is now described with reference to the drawings. FIG. 16 is a diagram showing an example of the change over time in the acceleration sensor value G2V when at Step S433, the absolute value of the acceleration sensor value G2V has continued to be greater than the first acceleration sensor threshold TH1G2V for the predetermined period. FIG. 17, on the other hand, is a diagram showing an example of the change over time in the acceleration sensor value G2V when at Step S431, the absolute value of the acceleration sensor value G2V is greater than the first acceleration sensor threshold TH1G2V but not maintained for the predetermined period. In each of FIG. 16 and FIG. 17, the ordinate represents the acceleration sensor value G2V, and the abscissa represents the time.

As discussed above, the signal output from the acceleration sensor G2 is greatly affected by an inertial force. Therefore, for example, when the user intentionally moves the motorized balance board 1 quickly frontward and rearward, the acceleration sensor value G2V mildly changes as shown in FIG. 16. In this case, the absolute value of the acceleration sensor value G2V continues to be greater than the first acceleration sensor threshold TH1G2V over a predetermined period (about 100 msec in FIG. 16).

On the other hand, when the motorized balance board 1 vibrates because of an irregular surface of the ground or the like, the acceleration sensor value G2V sharply changes as shown in FIG. 17. In this case, the absolute value of the acceleration sensor value G2V becomes greater than the first acceleration sensor threshold TH1G2V for some period, but fails to continue to be greater over a predetermined period (about 100 msec in FIG. 17). In other words, at Step S433, it is determined whether the user is intentionally changing the acceleration sensor value G2V or not. Note that the predetermined period and the first acceleration sensor threshold TH1G2V at Step S433 may be determined according to the configuration of the motorized balance board 1 or the like.

When in the process of Step S433, the absolute value of the acceleration sensor value G2V has continued to be greater than the first acceleration sensor threshold TH1G2V for the predetermined period, the microcomputer 94 determines that the user is about to descend and dismount from the motorized balance board 1. In this case, the control mode switch element 942*d* switches the control mode to the standby mode (Step S431 in FIG. 13).

When at Step S433, the absolute value of the acceleration sensor value G2V is equal to or smaller than the first acceleration sensor threshold TH1G2V or fails to continue to be greater than the first acceleration sensor threshold TH1G2V for the predetermined period, then the acceleration sensor value determination element 945*d* determines whether or not the motorized balance board 1 is experiencing abnormal vibrations (Step S434).

Figure 18:
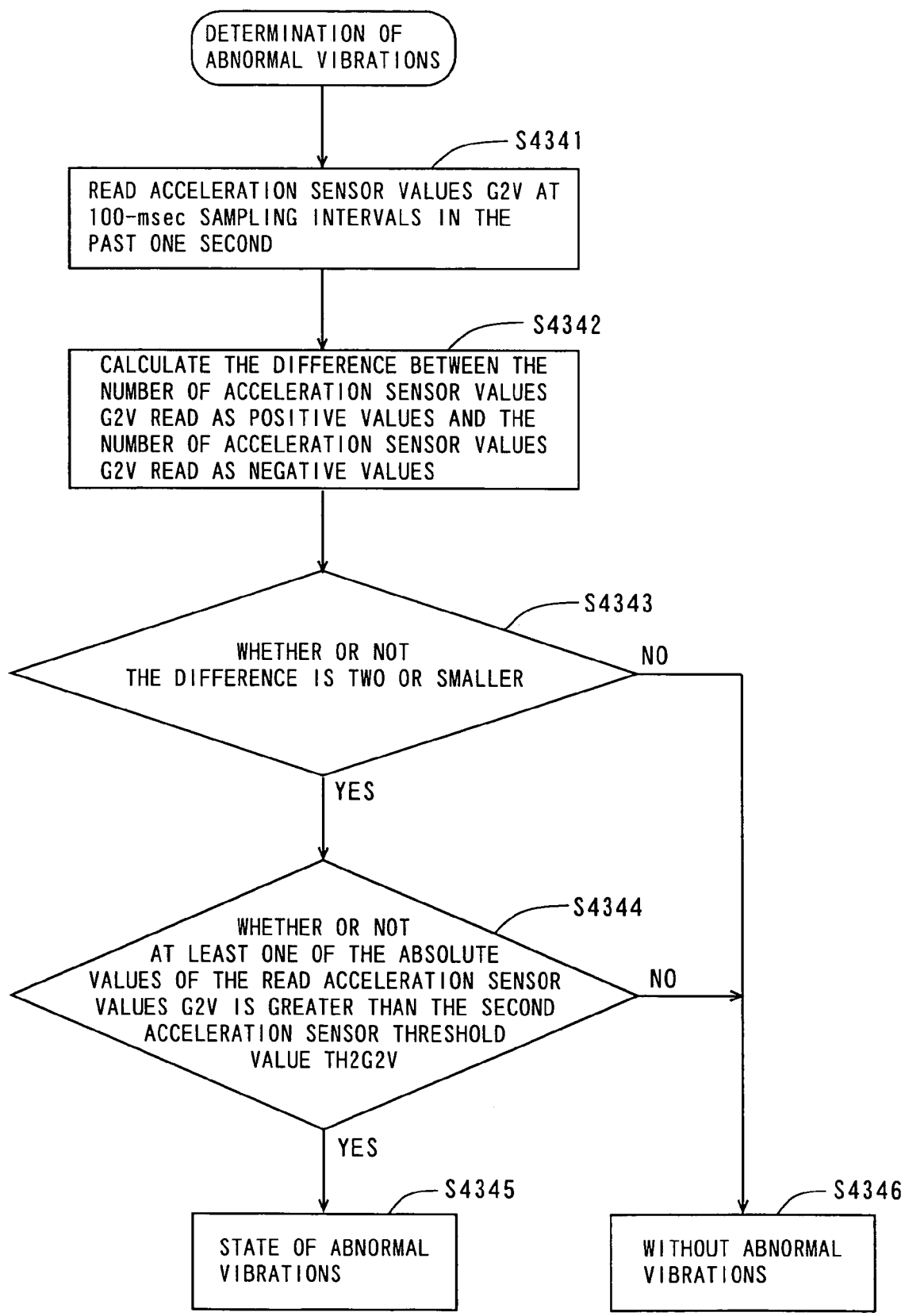
FIG. 18 is a flowchart showing details of the detection of abnormal vibrations.

Now, the process of Step S434 will be described with reference to the drawings. FIG. 18 is a flowchart for the detection of abnormal vibrations at Step S434.

As shown in FIG. 18, at Step S434, the acceleration sensor value determination element 945*d* first reads acceleration sensor values G2V at approximately 100-msec sampling intervals, for example, in the past one second (Step S4341). More specifically, ten acceleration sensor values G2V are preferably read at Step S4321.

Next, the acceleration sensor value determination element 945*d* calculates the difference between the number of acceleration sensor values G2V that were read as positive values and the number of acceleration sensor values G2V that were read as negative values at Step 4341 (Step S4342).

The acceleration sensor value determination element 945*d* subsequently determines whether or not the difference calculated at Step S4342 is two or smaller (Step S4343). When the difference is two or smaller, the acceleration sensor value determination element 945*d* determines whether or not at least one of the absolute values of the acceleration sensor values G2V that were read at Step S4341 is greater than a second acceleration sensor threshold TH2G2V (Step S4344).

When at least one of the absolute values of the acceleration sensor values G2V read at Step S4341 is greater than the second acceleration sensor threshold TH2G2V, the acceleration sensor value determination element 945*d* determines that the motorized balance board 1 is in the state of experiencing abnormal vibrations (Step S4345).

When at Step S4343, the difference calculated at Step S4342 is three or greater, then the acceleration sensor value determination element 945*d* determines that the motorized balance board 1 is not in the state of experiencing abnormal vibrations (Step S4346).

When at Step S4344, the absolute values of all of the acceleration sensor values G2V read at Step S4341 are equal to or smaller than the second acceleration sensor threshold TH2G2V, the acceleration sensor value determination element 945*d* determines that the motorized balance board 1 is not in the state of experiencing abnormal vibrations (Step S4346).

Determination of the state of experiencing abnormal vibrations for the motorized balance board 1 will now be described with reference to the drawings. FIG. 19 is a diagram showing an example of the change over time in the acceleration sensor value G2V when the motorized balance board 1 is in the state of experiencing abnormal vibrations. In FIG. 19, the ordinate represents the acceleration sensor value G2V, and the abscissa represents the time.

If the user is not aboard the motorized balance board 1 when the control mode is the riding mode, the board assembly of the motorized balance board 1 is unstable. Thus, the board assembly irregularly vibrates, causing the acceleration sensor output value G2V to repeatedly fluctuate at short cycles, as shown in FIG. 19.

When ten acceleration sensor values G2V are read at approximately 100-msec sampling intervals during an arbitrary duration P shown in FIG. 19, the number of positive values is four, and the number of negative values is six. In this case, the difference is determined as two or smaller at Step S4343 in FIG. 18.

It is further seen that in FIG. 19, five of the absolute values of the read acceleration sensor values G2V are greater than the second acceleration sensor threshold TH2G2V. In this case, in the process of Step S4344 in FIG. 18, it is determined that at least one of the absolute values of the read acceleration sensor values G2V is greater than the second threshold TH2G2V, resulting in a determination that the motorized balance board 1 is in the state of experiencing abnormal vibrations.

Note that when the user is aboard the motorized balance board 1, the board assembly is stabilized by the user's weight, so that the maximum value of the absolute values of acceleration sensor output values G2V will not exceed the second acceleration sensor threshold TH2G2V, even if the motorized balance board 1 vibrates because of an irregular surface of the ground or the like. That is, the provision of the process of Step S4344 in FIG. 18 prevents, when the user is board the motorized balance board 1, a determination that the motorized balance board 1 is in the state of experiencing abnormal vibrations.

Moreover, when the motorized balance board 1 is normally moving in the riding mode, the acceleration sensor value G2V mildly changes. When ten acceleration sensor values G2V are read at approximately 100-msec sampling intervals, in such a case, most of the ten acceleration sensor values G2V are either positive or negative. Thus, at Step S4343, the difference is determined as more than three. This results in a determination that the motorized balance board 1 is not in the state of experiencing abnormal vibrations. In other words, the provision of the process of Step S4343 prevents, during normal movement of the motorized balance board 1, a determination of the state of experiencing abnormal vibrations.

As described above, by determining at Step S434 in FIG. 12 whether or not the motorized balance board 1 is in the state of experiencing abnormal vibrations, it is possible to determine whether or not the user is aboard the motorized balance board 1 in the riding mode. It is preferred that the sampling interval and the second acceleration sensor threshold TH2G2V at Step S434 are obtained through experiments, according to the configuration of the motorized balance board 1 or the like.

With a determination that the motorized balance board 1 is in the state of experiencing abnormal vibrations in the process of Step S434, the microcomputer 94 determines that the user is not aboard the motorized balance board 1. In this case, the control mode switch element 942d switches the control mode to the standby mode (Step S431 in FIG. 13). This prevents running of the motorized balance board 1 when the user is absent.

Figure 13:
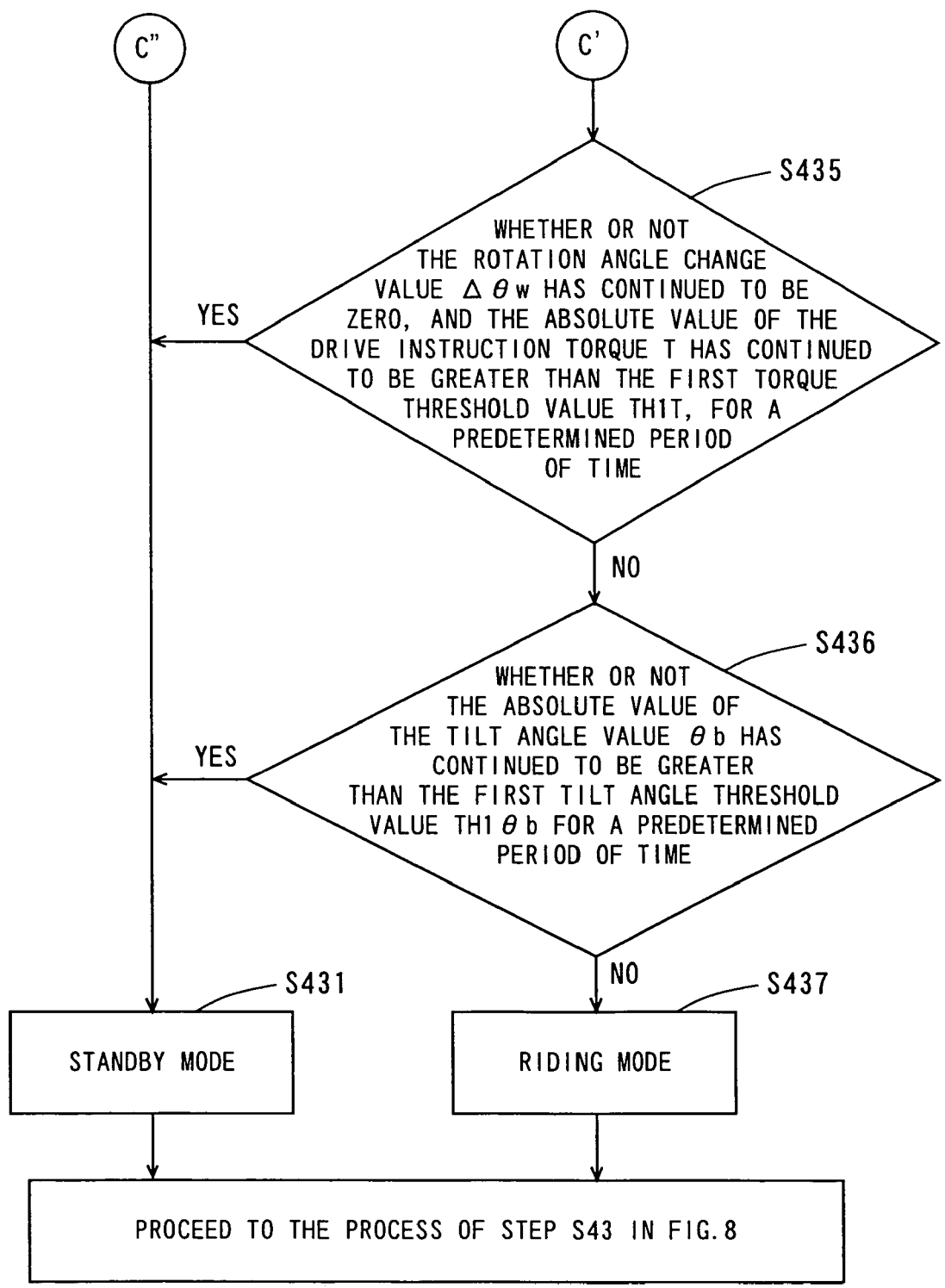
FIG. 13 is a flowchart showing details of the control mode setting process.

When the motorized balance board 1 is not in the state of experiencing abnormal vibrations at Step S434 in FIG. 12, then as shown in FIG. 13, the wheel rotation velocity determination element 943d, the drive torque determination element 946d, and the elapsed time determination element 941d (see FIG. 7) determine whether or not the rotation angle change value $\Delta\theta w$ has continued to be zero (i.e., the motorized balance board being stationary), and the absolute value of the drive instruction torque T calculated by the above-mentioned equation (4) has also continued to be greater than a first torque threshold TH1T, for a predetermined period (Step S435).

Figure 20A:
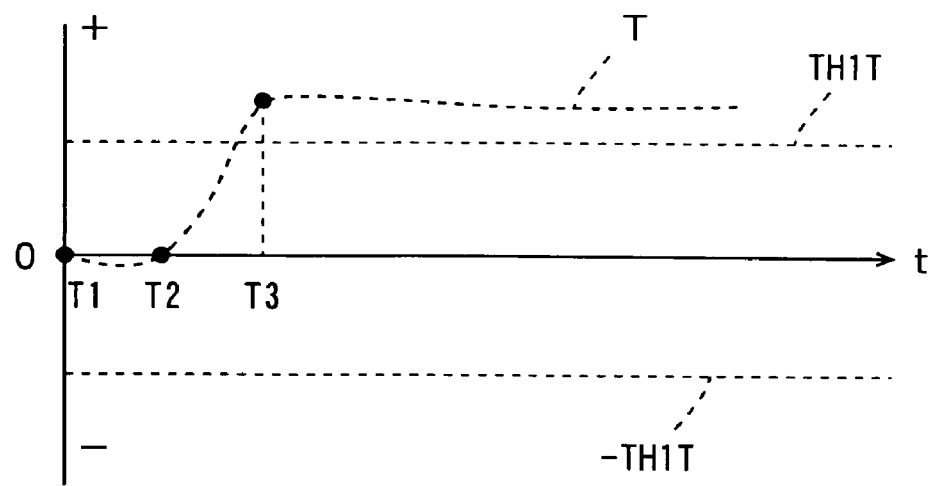
FIGS. 20(a) and 20(b) are diagrams each showing an example of the change over time in the drive instruction torque T when it is determined that the rotation angle change value Δθw has continued to be zero, and the absolute value of the drive instruction torque T has continued to be greater than the first torque threshold TH1T, for a predetermined period.
Figure 20B:
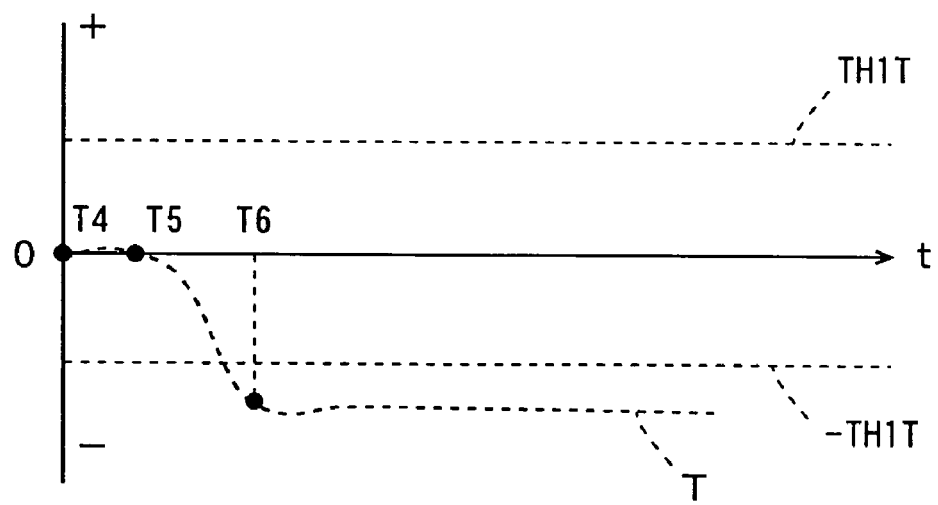

The process of Step S435 is now described with reference to the drawings. FIGS. 20 (a) and 20 (b) are diagrams each showing an example of the change over time in the drive instruction torque T when at Step S435, it is determined that the rotation angle change value $\Delta\theta w$ has continued to be zero, and the absolute value of the drive instruction torque T has also continued to be greater than the first torque threshold TH1T, for the predetermined period. In each of FIGS. 20 (a) and 20 (b), the ordinate represents the drive instruction torque T, and the abscissa represents the time.

FIG. 20 (a) shows an example of the change over time in the drive instruction torque T when the motorized balance board 1 is stopped with the front side of its board assembly being inclined towards the ground. In FIG. 20 (a), between the point T1 and point T2, the board assembly is approximately in a horizontal position with respect to the ground, and between the point T2 and point T3, the front side of the board assembly is gradually inclining towards the ground. After the period T3, the motorized balance board 1 is stationary with its board assembly inclining at a constant angle.

Next, FIG. 20 (b) shows an example of the change over time in the drive instruction torque T when the motorized balance board 1 is stopped with the rear side of its board assembly being inclined towards the ground. In FIG. 20 (b), between the point T4 and point T5, the board assembly is approximately in a horizontal position with respect to the ground, and between the point T5 and point T6, the rear side of the board assembly is gradually inclining towards the ground. After the period T6, the motorized balance board 1 is stationary with its board assembly inclining at a constant angle.

As shown in FIGS. 20 (a) and 20 (b), while the motorized balance board 1 is stopped with its board assembly inclining at a constant angle, the drive instruction torque T is maintained at a constant value according to the tilt angle of the board assembly. Without the process of Step S435 in this state, a drive current would continuously be applied to the motor 8a while the motorized balance board 1 is stopped. This would increase the current consumption although the motorized balance board 1 is not running. Moreover, a great load would be applied onto the motor 8a, leading to increased probability of failures in the motor 8a.

In this preferred embodiment, the provision of the process of Step S435 prevents a current from being applied to the motor 8a when the user has intentionally stopped the motorized balance board 1. This results in reduced power consumption and extended life of the motor 8a. Note that the predetermined period and the first torque threshold TH1T at Step S435 are preferably determined according to the configuration of the motorized balance board 1 or the like.

At Step 435, when the absolute value of the rotation angle change value $\Delta\theta w$ has continued to be zero, and the absolute value of the drive instruction torque T has also continued to be greater than the first torque threshold TH1T, for the predetermined period, the microcomputer 94 determines that the user has intentionally stopped the motorized balance board 1 to descend and dismount from the motorized balance board 1. In this case, the control mode switch element 942d switches the control mode to the standby mode (Step S431).

At Step S435, when the rotation angle change value $\Delta\theta w$ is not zero or when the absolute value of the drive instruction torque T is equal to or smaller than the first torque threshold TH1T or when the rotation angle change value $\Delta\theta w$ fails to continue to be zero, and the absolute value of the drive instruction torque T also fails to continue to be greater than the first torque threshold TH1T for the predetermined period, then the board angle determination element 947d and the elapsed time determination element 941d (see FIG. 7) determine whether or not the absolute value of the tilt angle value $\theta b$ has continued to be greater than a first tilt angle threshold TH1$\theta$b for a predetermined period (Step S436). With a determination that the absolute value of the tilt angle value $\theta b$ has continued to be greater than the first tilt angle threshold TH1$\theta$b for the predetermined time, the microcomputer 94 determines that the user is about to stop the motorized balance board 1, bringing the front or rear side of the board assembly close to the ground. In this case, the control mode switch element 942d switches the control mode to the standby mode (Step S431).

At Step S436, when the absolute value of the tilt angle value θb is equal to or smaller than the first tilt angle threshold TH1θb or fails to continue to be greater for the predetermined period, then the microcomputer 94 determines that the user will continue riding the motorized balance board 1. In this case, the control mode switch element 942d continues the riding mode (Step S437). Note that the first tilt angle threshold TH1θb and the predetermined period at Step S436 may be determined by the user as desired.

When at Step S414 in FIG. 9 the control mode is the rising mode, then as shown in FIG. 14, the elapsed time determination element 941d determines whether or not a predetermined period (for example, one sec) has elapsed (Step S438). When the predetermined period has elapsed, the control mode switch element 942d switches the control mode to the standby mode (Step S439). After that, the microcomputer 94 proceeds to the process at Step S43 in FIG. 8.

In this preferred embodiment, if the transfer of the control mode to the balance stabilized mode is not achieved within a second after the control mode has turned to the rising mode, then the transfer of the control mode to the balance stabilized mode is assumed to be a failure. In other words, the process of Step S438 is provided to transfer the control mode to the standby mode in the case of a transfer failure from the rising mode to the balance stabilized mode.

When the predetermined period has not elapsed at Step S438, the board angle determination element 947d and the wheel rotation velocity determination element 943d determine whether or not the absolute value of the tilt angle value θb is smaller than a second tilt angle threshold TH2θb, and the absolute value of the rotation angle change value Δθw is smaller than a stationary angular velocity threshold THquΔθw (Step S440). When the absolute value of the tilt angle value θb is smaller than the second tilt angle threshold TH2θb, and the absolute value of the rotation angle change value Δθw is smaller than the stationary angular velocity threshold THquΔθw, the microcomputer 94 determines that the motorized balance board 1 is stationary with its board assembly being kept approximately horizontal. In this case, the control mode switch element 942d switches the control mode to the balance stabilized mode (Step S441). After that, the microcomputer 94 proceeds to the process of Step S43 in FIG. 8. Note that the second tilt angle threshold TH2θb and the stationary angular velocity threshold THquΔθw at Step S440 are preferably determined according to the configuration of the motorized balance board 1 or the like.

When at Step S440, the absolute value of the tilt angle value θb is equal to or greater than the second tilt angle threshold TH2θb or when the absolute value of the rotation angle change value Δθw is equal to or greater than the stationary angular velocity threshold THquΔθw, the microcomputer 94 determines that the motorized balance board 1 is not stationary with its board assembly being kept approximately horizontal. In this case, the control mode switch element 942d continues the rising mode (Step S442). After that, the microcomputer 94 proceeds to the process of Step S43 in FIG. 8.

Figure 15:
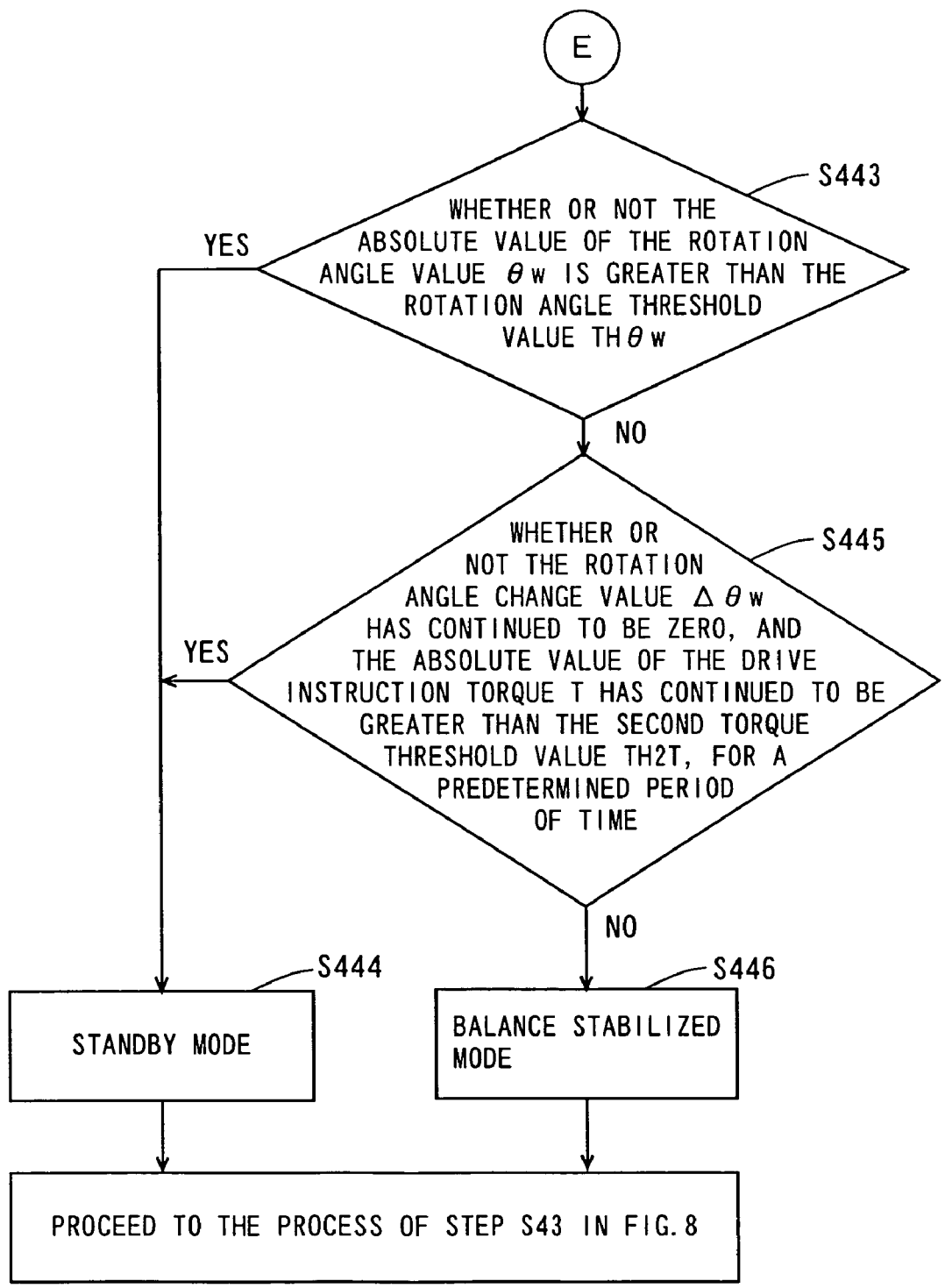
FIG. 15 is a flowchart showing details of the control mode setting process.

When in the process of Step S414 of FIG. 9 the control mode is not the rising mode, which means that the control mode is the balance stabilized mode, then as shown in FIG. 15, the wheel rotation angle determination element 948d (see FIG. 7) determines whether or not the absolute value of the rotation angle value θw is greater than a rotation angle threshold THθw (Step S443). When the absolute value of the rotation angle value θw is greater than the rotation angle threshold THθw, the control mode switch element 942d switches the control mode to the standby mode (Step S444). After that, the microcomputer 94 proceeds to the process of Step S43 in FIG. 8.

Step S443 is provided to finish the balance stabilized mode when the rotation angle value θw has greatly changed, i.e., the position of the motorized balance board 1 has greatly moved since the motorized balance board 1 was powered and turned into the balance stabilized mode. Note that the value of the rotation angle threshold THθw is preferably determined according to such conditions as the place of use of the motorized balance board 1 or the like.

When at Step S443, the absolute value of the rotation angle value θw is equal to or smaller than the rotation angle threshold THθw, then the wheel rotation angle determination element 948d, the drive torque determination element 944d, and the elapsed time determination element 941d determine whether or not the rotation angle change value Δθw (velocity of the motorized balance board 1) has continued to be zero, and the absolute value of the drive instruction torque T has also continued to be greater than a second torque threshold TH2T, for a predetermined period (Step S445). When the rotation angle change value Δθw has continued to be zero, and the absolute value of the drive instruction torque T has also continued to be greater than the second torque threshold TH2T, for the predetermined period, then the microcomputer 94 determines that the user has intentionally stopped the motorized balance board 1. In this case, the control mode switch element 942d switches the control mode to the standby mode (Step S444). Note that the second torque threshold TH2T and the predetermined period at Step S445 may be determined by the user as desired.

When at Step S445, the rotation angle change value Δθw is not zero or when the absolute value of the drive instruction torque T is equal to or smaller than the second torque threshold TH2T or when the rotation angle change value Δθw fails to continue to be zero, and the absolute value of the drive instruction torque T also fails to continue to be greater for the predetermined period, then the control mode switch element 942d continues the balance stabilized mode (Step S446).

(3-5) Drive Instruction Process (Step S5)

In the drive instruction process at Step S5 (see FIG. 4), the microcomputer 94 provides the motor driver 92 with a current instruction value which was calculated in the process of calculating the current instruction value at Step S 43 in FIG. 8. This causes the motorized balance board 1 to operate according to each control mode.

(4) Effects of the Motorized Balance Board According to Preferred Embodiments

As described above, in the motorized balance board 1 according to the present preferred embodiment, the control mode setting unit 94b determines the control mode based on the respective values calculated in the arithmetic operation unit 94a. In this manner, the microcomputer 94 is capable of determining the mounting and dismounting of the user onto and from the motorized balance board 1 while controlling the operation of the motorized balance board 1 according to the determined state. This obviates the need to provide a device for determining the mounting and dismounting of the user onto and from the motorized balance board 1, a switch for switching among the control modes, and the like. This allows for reduced cost of manufacturing the motorized balance board 1.

Further, as shown by Step S427 in FIG. 11, when the control mode is the standby mode, the control mode is changed to the riding mode when the absolute value of the tilt angle change value Δθb is greater than the riding angular velocity threshold THonΔθb. More specifically, the control mode is switched to the riding mode when the user has intentionally changed the tilt angle of the board assembly of the motorized balance board 1 to a predetermined angular velocity or greater, causing the motorized balance board 1 to move. This prevents the motorized balance board 1 from starting to move before the user gets fully aboard the board assembly, allowing the user to move the motorized balance board 1 at his or her own will after having mounted the board assembly safely.

In addition, as shown by Step S430 in FIG. 12, when the control mode is the riding mode, the control mode is changed to the standby mode when the absolute value of the tilt angle change value $\Delta\theta b$ is greater than the descending angular velocity threshold $TH_{off}\Delta\theta b$. More specifically, the control mode is switched to the standby mode when the user has intentionally changed the tilt angle of the board assembly of the motorized balance board 1 to a predetermined angular velocity or greater, causing the motorized balance board 1 to stop. This allows the user to safely dismount from the motorized balance board 1.

As described above, with the motorized balance board 1 according to the present preferred embodiment, the user can select a control mode by intentionally moving the board assembly. This prevents operations of the vehicle which are unforeseen or unexpected by the user, thus resulting in improved safety of the motorized balance board 1.

(5) Correspondence Between Each Claim Element and Each Component In the Preferred Embodiment In the above-described preferred embodiment, the board assembly corresponds to a body, the motor 8a corresponds to a drive, the gyrosensor G1 and the acceleration sensor G2 correspond to a tilt detector, the drive controller 9 and the microcomputer 94 correspond to a controller; the wheel rotation angle detecting sensor 8c corresponds to a rotation detector, the control modes correspond to operating modes, the riding mode corresponds to a moving mode, and the standby mode corresponds to a stop mode.

Further, the tilt angle value $\theta b$ and tilt angle change value $\Delta\theta b$ correspond to data concerning a tilt angle, the tilt angle change value $\Delta\theta b$ corresponds to a rate of change of the tilt angle and an amount of change in the tilt angle per a predetermined period, the rotation angle change value $\Delta\theta w$ corresponds to data concerning a rotation angle, a rate of change of the rotation angle, and an amount of change in the rotation angle of the wheel per a predetermined period, and the riding angular velocity threshold $TH_{on}\Delta\theta b$ and descending angular velocity threshold $TH_{off}\Delta b$ correspond to a predetermined threshold value.

However, it should be noted that the above-described elements corresponding to the claim elements are merely examples and the claims are not limited to the corresponding elements described above and can include many other elements that perform similar functions and have similar operation.

(6) Other Preferred Embodiments

In the above-described preferred embodiment, the functional units in each of the arithmetic operation unit 94a in FIG. 5 and the control mode setting unit 94b in FIG. 7 are preferably implemented by the microcomputer 94 and the control program thereof. However, some or all of the functional units in each of the arithmetic operation unit 94a and the control mode setting unit 94b may alternatively be implemented by hardware such as logic circuits. Further, a CPU or a memory may be used as an alternative to the microcomputer 94.

The body is not limited to the board assembly as in the above-described preferred embodiment. For example, integrally formed plate-like members may be used as an alternative to the board assembly. Moreover, other torque generators such as an engine may be used for the driver as an alternative to the motor 8a.

Although the above-described preferred embodiment describes the motorized balance board 1 as having a single wheel 8, the motorized balance board 1 may be provided with a plurality of coaxial wheels as an alternative to the single wheel 8. That is, the motorized balance board 1 may have a plurality of wheels in a direction that intersects with the moving direction.

Furthermore, the tilt detector is not limited to the gyrosensor G1 and the acceleration sensor G2. For example, either of the gyrosensor G1 or acceleration sensor G2 may be used. The rotation detector is not limited to the encoder either, and may include, for example, a variety of optical sensors, mechanical switches, and the like.

In addition, at Step S436 in FIG. 13, determination as to whether or not the control mode is switched to the standby mode is preferably based on the tilt angle of the board assembly. However, the determination may alternatively be made by such method as will be described below.

Figure 21:
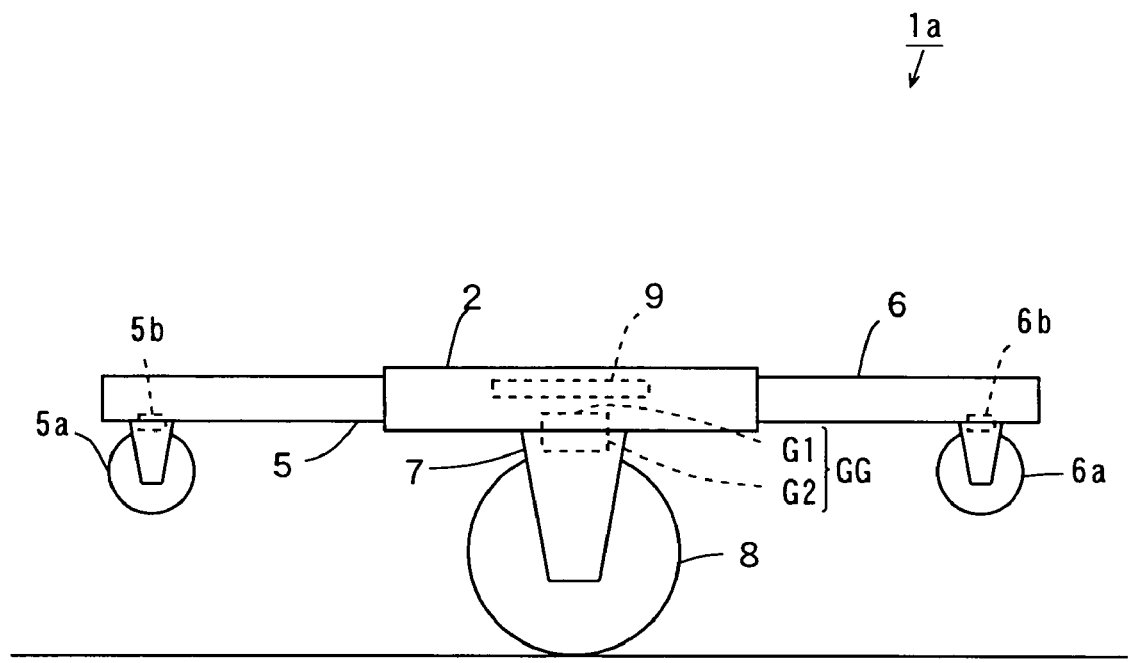
FIG. 21 is a schematic side view showing another configuration a motorized balance board.

FIG. 21 is a schematic side view showing another structure of a motorized balance board. The motorized balance board in FIG. 21 differs from the motorized balance board 1 in FIG. 2 as follows.

The motorized balance board 1a in FIG. 21 includes an auxiliary wheel 5a and an auxiliary wheel 6a attached on the front end of the platform plate 5 and the rear end of the platform plate 6, respectively. The auxiliary wheel 5a and auxiliary wheel 6a are provided with a switch 5b and a switch 6b, respectively. The switch 5b and switch 6b, respectively, are designed to be activated, for example when the auxiliary wheel 5a and auxiliary wheel 6a come into contact with the ground.

In this case, by measuring the time during which the switch 5b or switch 6b is activated, it is possible to measure the time during which the motorized balance board 1 is running with the auxiliary wheel 5a or auxiliary wheel 6a in contact with the ground, i.e., with the board assembly greatly inclining. Thus, the control mode may be switched to the standby mode via the control mode switch element 942d when the switch 5b or switch 6b has continued to be activated for a predetermined period. This allows a determination similar to that at Step S436 in FIG. 13 to be made.

Although the present invention has been described and illustrated in detail with respect to preferred embodiments thereof, it is clearly understood that this description is by way of illustration and example only and is not to be taken by way of limitation, the spirit and scope of the present invention being limited only by the terms of the following claims.

What is claimed is:

1. A vehicle comprising:

a body on which a user rides;

a wheel that is rotatably supported on said body;

a driver that drives said wheel;

a tilt detector that detects data concerning a tilt angle of said body; and a controller that controls said driver according to a plurality of operating modes; wherein said controller selects an operating mode that corresponds to an output of said tilt detector; and one of the plurality of operating modes includes a rising mode that causes the body to rise from the ground to a horizontal position relative to the ground.

2. The vehicle according to claim 1, wherein said data concerning the tilt angle includes a rate of change of the tilt angle of said body.

3. The vehicle according to claim 2, wherein said rate of change of the tilt angle of said body is an amount of change in the tilt angle of said body per a predetermined period.

4. The vehicle according to claim 2, wherein said controller switches one operating mode to another operating mode when said rate of change of the tilt angle is not less than a predetermined threshold value.

5. The vehicle according to claim 1, wherein said plurality of operating modes include a moving mode in which said body moves and a stop mode in which said body is stopped.

6. The vehicle according to claim 5, further comprising a rotation detector that detects data concerning a rotation angle of said wheel, wherein said controller controls, in said moving mode, said movement caused by said driver based on said data concerning the tilt angle and said data concerning the rotation angle.

7. The vehicle according to claim 6, wherein said data concerning the tilt angle includes said rate of change of the tilt angle of said body and said tilt angle of said body, and said data concerning the rotation angle includes a rate of change of the rotation angle of said wheel.

8. The vehicle according to claim 5, further comprising a rotation detector that detects data concerning a rotation angle of said wheel, wherein said controller controls, in said stop mode, said driver to stop said wheel based on said data concerning the rotation angle.

9. The vehicle according to claim 8, wherein said data concerning the rotation angle of said wheel includes a rate of change of the rotation angle of said wheel.

10. The vehicle according to claim 9, wherein said rate of change of the rotation angle is an amount of change in the rotation angle of said wheel per a predetermined period.

11. The vehicle according to claim 1, wherein said wheel is arranged on a bottom surface of a central portion of said body so as to rotate about an axis in a direction that intersects with a moving direction of said body.

12. The vehicle according to claim 11, wherein said body is arranged so as to vertically incline with said wheel defining a supporting point.

13. A vehicle control device for controlling a vehicle that includes a body on which a user rides, a wheel that is rotatably supported on said body, and a driver that drives said wheel, said control device comprising:
    a tilt detector that detects data concerning a tilt angle of said body; and
    a controller that controls said driver according to a plurality of operating modes; wherein
    said controller selects an operating mode that corresponds to an output of said tilt detector; and
    one of the plurality of operating modes includes a rising mode that causes the body to rise from the ground to a horizontal position relative to the ground.

14. The vehicle control device according to claim 13, wherein said data concerning the tilt angle includes a rate of change of the tilt angle of said body.

15. The vehicle control device according to claim 14, wherein said rate of change of the tilt angle of said body is an amount of change in the tilt angle of said body per a predetermined period.

16. The vehicle control device according to claim 14, wherein said controller switches one operating mode to another operating mode when said rate of change of the tilt angle is not less than a predetermined threshold value.

17. A vehicle control method for controlling a vehicle that includes a body on which a user rides, a wheel that is rotatably supported on said body, and a driver that drives said wheel, said method comprising the steps of:
    detecting data concerning a tilt angle of said body; and
    controlling said driver to select an operating mode based on said data concerning the tilt angle of said body; wherein
    the operating mode includes a rising mode that causes the body to rise from the ground to a horizontal position relative to the ground.

18. The vehicle control method according to claim 17, wherein said data concerning the tilt angle includes a rate of change of the tilt angle of said body.

19. The vehicle control method according to claim 18, wherein said rate of change of the tilt angle of said body is an amount of change in the tilt angle of said body per a predetermined period.

20. The vehicle control method according to claim 18, wherein said step of controlling said driver includes the step of controlling said driver to switch one operating mode to another operating mode when said rate of change of the tilt angle is not less than a predetermined threshold value.

* * * * *